(12) United States Patent
Nakashima et al.

(10) Patent No.: US 12,497,274 B2
(45) Date of Patent: Dec. 16, 2025

(54) ELEVATING DEVICE

(71) Applicant: Daifuku Co., Ltd., Osaka (JP)

(72) Inventors: Kouichirou Nakashima, Hinocho (JP); Akira Miyahara, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 414 days.

(21) Appl. No.: 18/098,300

(22) Filed: Jan. 18, 2023

(65) Prior Publication Data

US 2023/0227295 A1 Jul. 20, 2023

(30) Foreign Application Priority Data

Jan. 19, 2022 (JP) .................................. 2022-006657

(51) Int. Cl.
*B66F 9/02* (2006.01)
(52) U.S. Cl.
CPC ...................................... *B66F 9/02* (2013.01)
(58) Field of Classification Search
CPC ................ B65G 1/00; B65G 1/04; B66F 9/02
See application file for complete search history.

(56) References Cited

U.S. PATENT DOCUMENTS

2020/0087064 A1* 3/2020 Hendrix ............... B65G 1/0428

FOREIGN PATENT DOCUMENTS

| CN | 104986686 | A | * | 10/2015 | | |
|---|---|---|---|---|---|---|
| CN | 112644939 | A | * | 4/2021 | ........... | B65G 1/0407 |
| CN | 114394434 | A | * | 4/2022 | | |
| CN | 216377370 | U | * | 4/2022 | | |
| CN | 114683920 | A | * | 7/2022 | .............. | B60L 53/80 |
| CN | 115490020 | A | * | 12/2022 | | |
| FR | 2733221 | A1 | * | 10/1996 | ................ | B66F 9/02 |
| JP | 7109828 | A | | 4/1995 | | |
| JP | 2000118969 | A | | 4/2000 | | |
| JP | 2000198689 | A | | 7/2000 | | |
| JP | 2000300626 | A | | 10/2000 | | |
| JP | 200372907 | A | | 3/2003 | | |
| JP | 201440306 | A | | 3/2014 | | |

* cited by examiner

*Primary Examiner* — Diem M Tran
(74) *Attorney, Agent, or Firm* — The Webb Law Firm

(57) ABSTRACT

An elevating device includes: a mount section on which an article is placeable; a protruding-retreating mechanism supporting the mount section and configured to cause the mount section to protrude and retreat in a protruding-retreating direction extending in a horizontal direction; an elevating mechanism supporting the protruding-retreating mechanism and configured to raise and lower the protruding-retreating mechanism; and a base supporting the elevating mechanism, wherein the elevating mechanism includes a first support section being an area supporting the protruding-retreating mechanism, the elevating device further includes a second support section being separate from the first support section and supporting the protruding-retreating mechanism, and the second support section is configured to (i) allow the elevating mechanism to raise and lower the protruding-retreating mechanism, and (ii) support a moment that acts on the protruding-retreating mechanism with the first support section serving as a fulcrum.

8 Claims, 11 Drawing Sheets

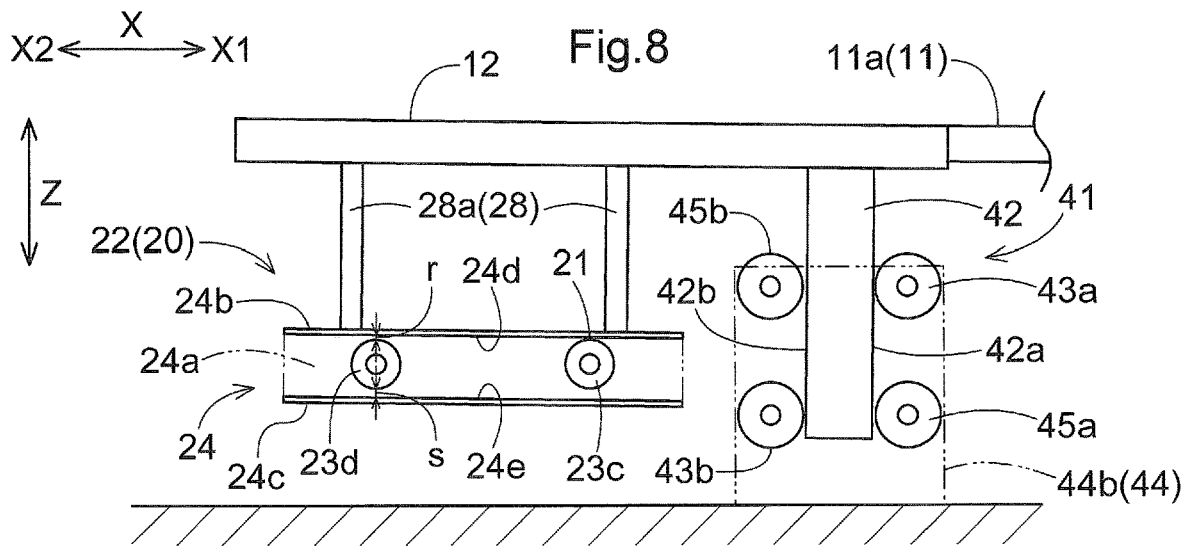
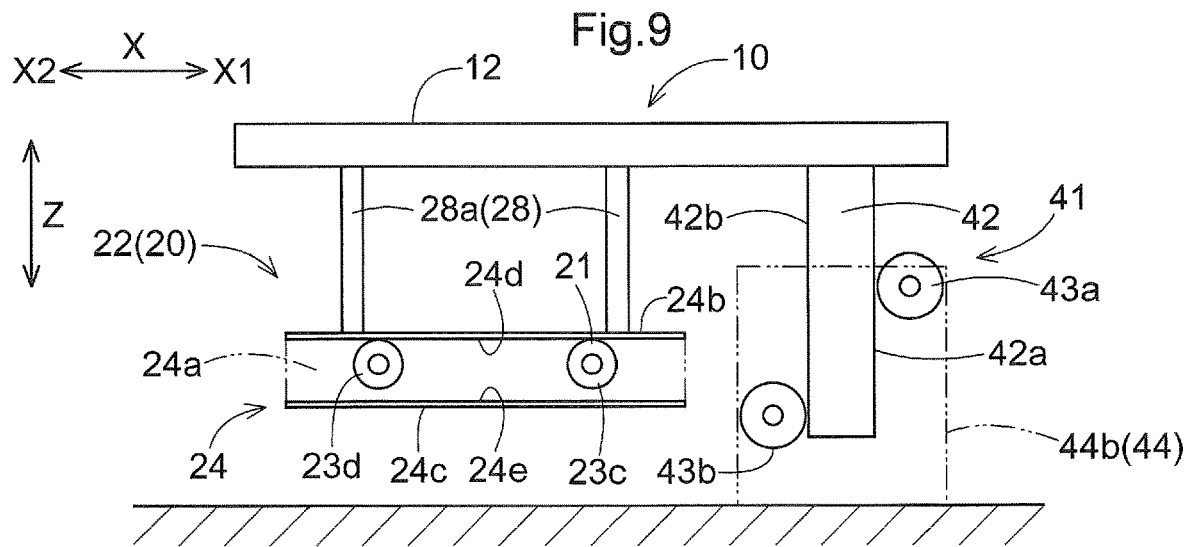
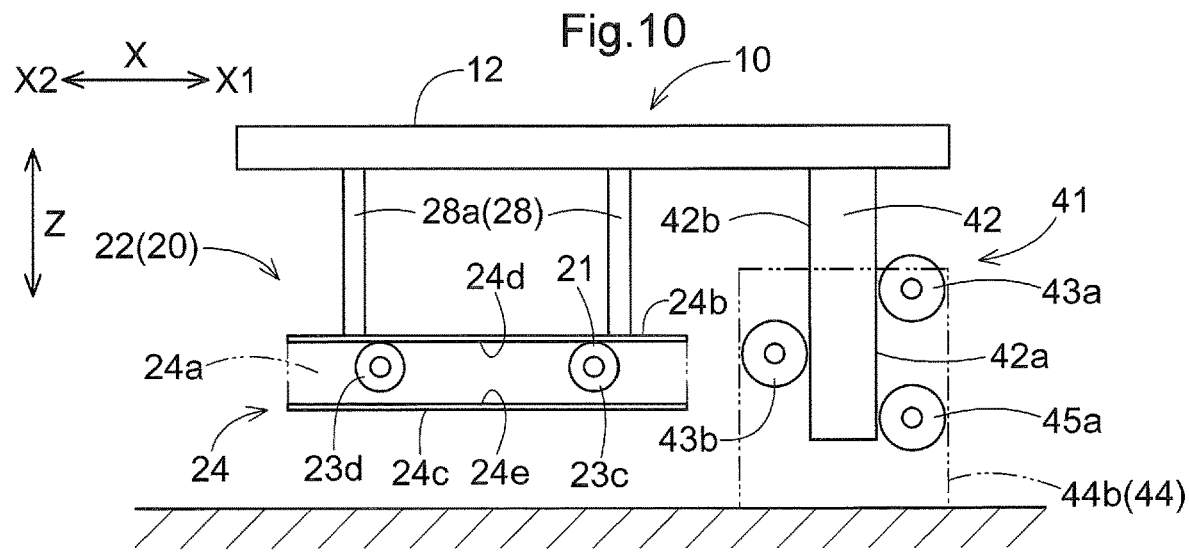

ELEVATING DEVICE

CROSS-REFERENCE TO RELATED APPLICATION

This application claims priority to Japanese Patent Application No. 2022-006657 filed Jan. 19, 2022, the disclosure of which is hereby incorporated by reference in its entirety.

BACKGROUND OF THE INVENTION

1. Field of the Invention

The present invention relates to an elevating device that includes a mount section on which an article is placeable, a protruding-retreating mechanism supporting the mount section and configured to cause the mount section to protrude and retreat in a protruding-retreating direction extending in a horizontal direction, an elevating mechanism supporting the protruding-retreating mechanism and configured to raise and lower the protruding-retreating mechanism, and a base supporting the elevating mechanism.

2. Description of the Related Art

JP H7-109828A (Patent Document 1) discloses an example of an elevating device such as the above-described device. In the following, reference numerals in parentheses in the description of background art are those used in Patent Document 1.

An elevating device (table lifter 1) of Patent Document 1 includes a mount section (upper-stage sliding table 99) for an operator to work or place an article thereon, a protruding-retreating mechanism (lower-stage sliding table 85, sliding-movement operation mechanism 185) configured to cause the mount section to protrude and retreat along a horizontal plane; an elevating mechanism (pantograph-type elevation guide mechanism 65) configured to raise and lower the mount section and the protruding-retreating mechanism; a table (11) being above the elevating mechanism and supporting the mount section and the protruding-retreating mechanism; and a base (3) supporting the elevating mechanism. This elevating device has a drive motor (239) for driving the protruding-retreating mechanism in the table (11) rather than the mount section that protrudes and retreats in the horizontal direction. This makes the moment that acts to incline the protruding-retreating mechanism with a load in the up-down direction acting on the mount section smaller than the moment that acts in the case where the drive motor (239) is in the mount section.

In an elevating device such as the above-described device, upon the mount section reaching a position at which it protrudes in the horizontal direction relative to the elevating mechanism, a moment that inclines the protruding-retreating mechanism acts with a portion of the elevating mechanism that supports the protruding-retreating mechanism serving as a fulcrum. To appropriately support this moment, the elevating mechanism and the protruding-retreating mechanism need to have large support rigidity, which involves, for example, increasing the rigidity of each part and increasing the support span in the protruding-retreating direction. Consequently, not only the support structure but the entire elevating device is likely to increase in size.

SUMMARY OF THE INVENTION

It is, therefore, desired to realize an elevating device capable of appropriately supporting the moment that acts on the protruding-retreating mechanism while preventing an increase in the size.

An elevating device according to the present disclosure includes:

a mount section on which an article is placeable;

a protruding-retreating mechanism supporting the mount section and configured to cause the mount section to protrude and retreat in a protruding-retreating direction extending in a horizontal direction;

an elevating mechanism supporting the protruding-retreating mechanism and configured to raise and lower the protruding-retreating mechanism; and a base supporting the elevating mechanism, wherein the elevating mechanism includes a first support section being an area supporting the protruding-retreating mechanism, the elevating device further includes a second support section being separate from the first support section and supporting the protruding-retreating mechanism, and the second support section is configured to (i) allow the elevating mechanism to raise and lower the protruding-retreating mechanism, and (ii) support a moment that acts on the protruding-retreating mechanism with the first support section serving as a fulcrum.

According to this configuration, the second support section separate from the first support section is provided as a support section that supports the protruding-retreating mechanism, and can support the moment that acts on the protruding-retreating mechanism with the first support section serving as a fulcrum. This enables the moment that acts on the protruding-retreating mechanism to be supported even if the distance between the mount section and the first support section in the protruding-retreating direction increases due to, for example, the mount section protruding in the protruding-retreating direction. Even if the support rigidity of the first support section is relatively low, it is possible to appropriately support the moment that acts to incline the protruding-retreating mechanism due to a load in the up-down direction that acts on the mount section. Accordingly, it is possible to prevent the entire elevating device from increasing in the size for increased support rigidity of the first support section.

As described above, according to this configuration, it is possible to appropriately support the moment that acts on the protruding-retreating mechanism while preventing an increase in the size.

Further features and advantages of the elevating device will be apparent from the following description of illustrative and non-limiting embodiments that will be described with reference to the drawings.

BRIEF DESCRIPTION OF THE DRAWINGS

FIG. 8 is a side view schematically showing a second support section and the elevating mechanism with a protruding-retreating mechanism being inclined.

FIG. 9 is a side view schematically showing the second support section and the elevating mechanism according to another embodiment.

FIG. 10 is a side view schematically showing the second support section and the elevating mechanism according to another embodiment.

DESCRIPTION OF THE INVENTION

1. Automated Warehouse

Figure 1:
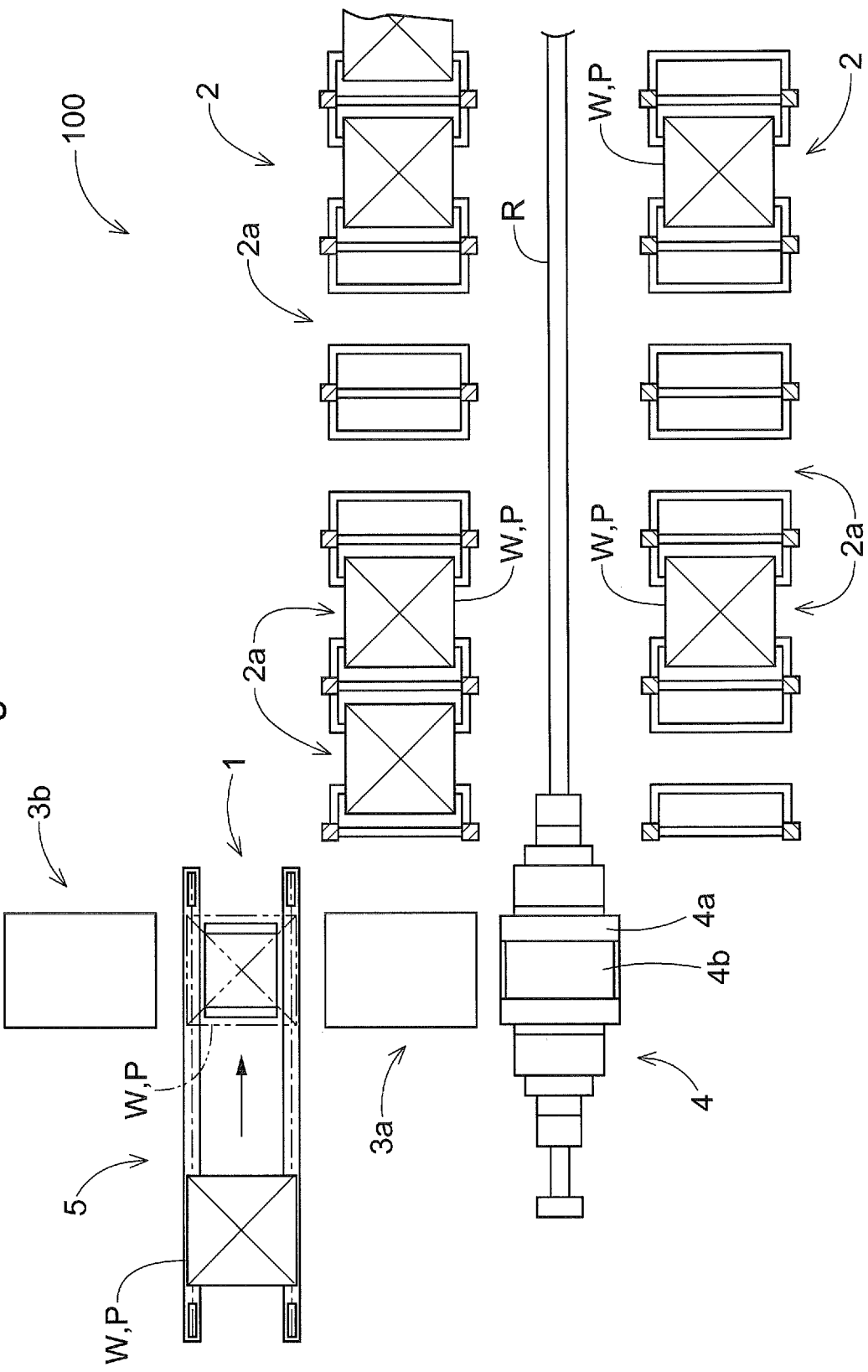
FIG. 1 is a plan view of an automated warehouse.

Hereinafter, an example of applying an elevating device 1 to an automated warehouse 100 will be described with reference to the drawings. The automated warehouse 100 in this embodiment includes storage cabinets 2 for housing articles W, a loading conveyor 5 for loading the articles W into the automated warehouse 100 from the outside, a first support table 3a for supporting the articles W, a transport device 4 for transporting the articles W between the first support table 3a and the storage cabinets 2, and an elevating device 1, as shown in FIG. 1. The automated warehouse 100 in this example also includes a second support table 3b for supporting the articles W, and an unloading conveyor (not shown) for unloading the articles W to the outside of the automated warehouse 100.

Each article W is transported to the elevating device 1 by the loading conveyor 5. The elevating device 1, upon receiving the article W from the loading conveyor 5, delivers this article W to the first support table 3a. The transport device 4 receives the article W on the first support table 3a and places the received article W in one housing section 2a in the storage cabinets 2. Meanwhile, an article W housed in a housing section 2a is transported to the first support table 3a by the transport device 4. The elevating device 1 then receives this article W on the first support table 3a and delivers the received article W to the second support table 3b. The article W on the second support table 3b is transferred to the unloading conveyor (not shown) and unloaded to the outside of the automated warehouse 100. The elevating device 1 in this example can thus transfer articles W to both the first support table 3a and the second support table 3b. Note that each article W in this example is transported while being on a pallet P. Articles W are stored in respective housing sections 2a of the storage cabinets 2 while being on respective pallets P.

The transport device 4 in the example in FIG. 1 moves while being guided by a rail R located in front of the storage cabinets 2 (on the front-face side of the housing sections 2a). Here, the transport device 4 is a stacker crane. The transport device 4 includes an elevator 4a that moves upward and downward in the up-down direction, and a protruding-retreating section 4b. The protruding-retreating section 4b is in the elevator 4a. The transport device 4 delivers and receives articles W to and from the first support table 3a and the housing sections 2a with use of the protruding-retreating section 4b.

The storage cabinets 2 are parallel to the rail R. Each storage cabinet 2 includes a plurality of housing sections 2a that are next to each other in the up-down direction and a direction parallel to the rail R. Articles W in this example are stored in the plurality of housing sections 2a while being placed on pallets P. In the shown example, a pair of storage cabinets 2 oppose each other with the rail R therebetween. Note that examples of the articles W to be housed in the housing sections 2a include containers for housing objects to be housed. Objects to be housed may be food or the like, or may be components or the like used in a factory production line.

In the example in FIG. 1, the first support table 3a and the second support table 3b are on the opposite sides of the loading conveyor 5. The first support table 3a and the second support table 3b can support from below the pallets P with articles W thereon. The pallets P are placed on the first support table 3a and the second support table 3b with use of a protruding-retreating section, such as that of the transport device 4, for example. Similarly, the pallets P are transferred from the first support table 3a and the second support table 3b with use of a protruding-retreating section. Here, the first support table 3a and the second support table 3b have the same structure.

The loading conveyor 5 extends parallel to a direction in which the rail R extends. The loading conveyor 5 receives an article W from the outside and transports the received article W to a position corresponding to the elevating device 1 (in FIG. 1, an end region of the loading conveyor 5 that is closer to the storage cabinets 2). The article W transported to this position is transferred to the transport device 4 via the elevating device 1 and the first support table 3a. Note that the loading conveyor 5 in this example is a chain conveyor. The loading conveyor 5 may alternatively be any of various known conveyors other than a chain conveyor, such as a belt conveyor or a roller conveyor. The unloading conveyor (not shown) in this example is also a chain conveyor.

The elevating device 1 is installed within the loading conveyor 5. Specifically, the elevating device 1 is between two chain conveyors. The elevating device 1 in the shown example is in the end region of the loading conveyor 5 that is closer to the storage cabinets 2. Further, the elevating device 1 is between the first support table 3a and the second support table 3b. A detailed configuration of the elevating device 1 will be described below.

2. Elevating Device

Figure 2:
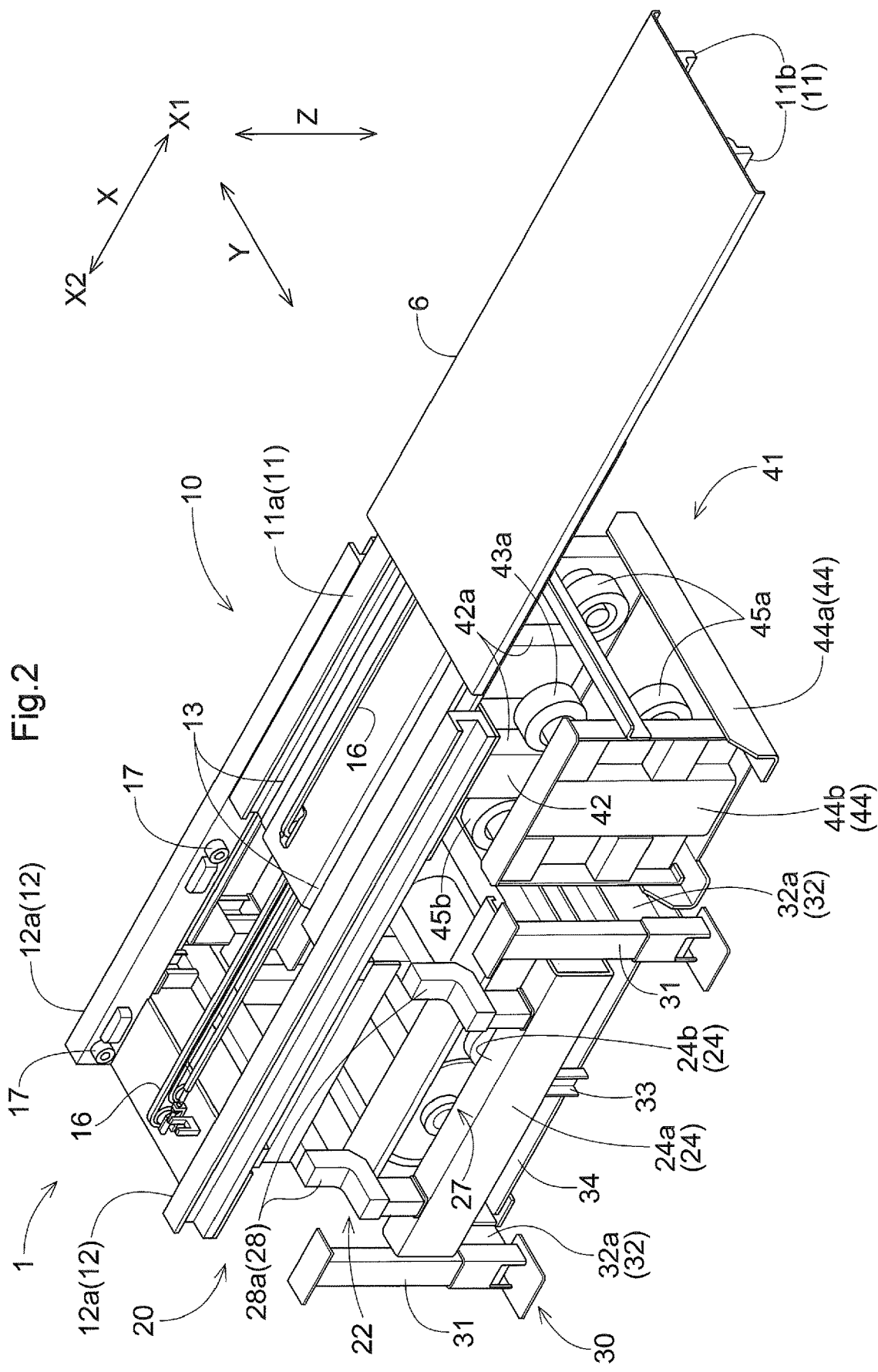
FIG. 2 is a perspective view of an elevating device.
Figure 3:
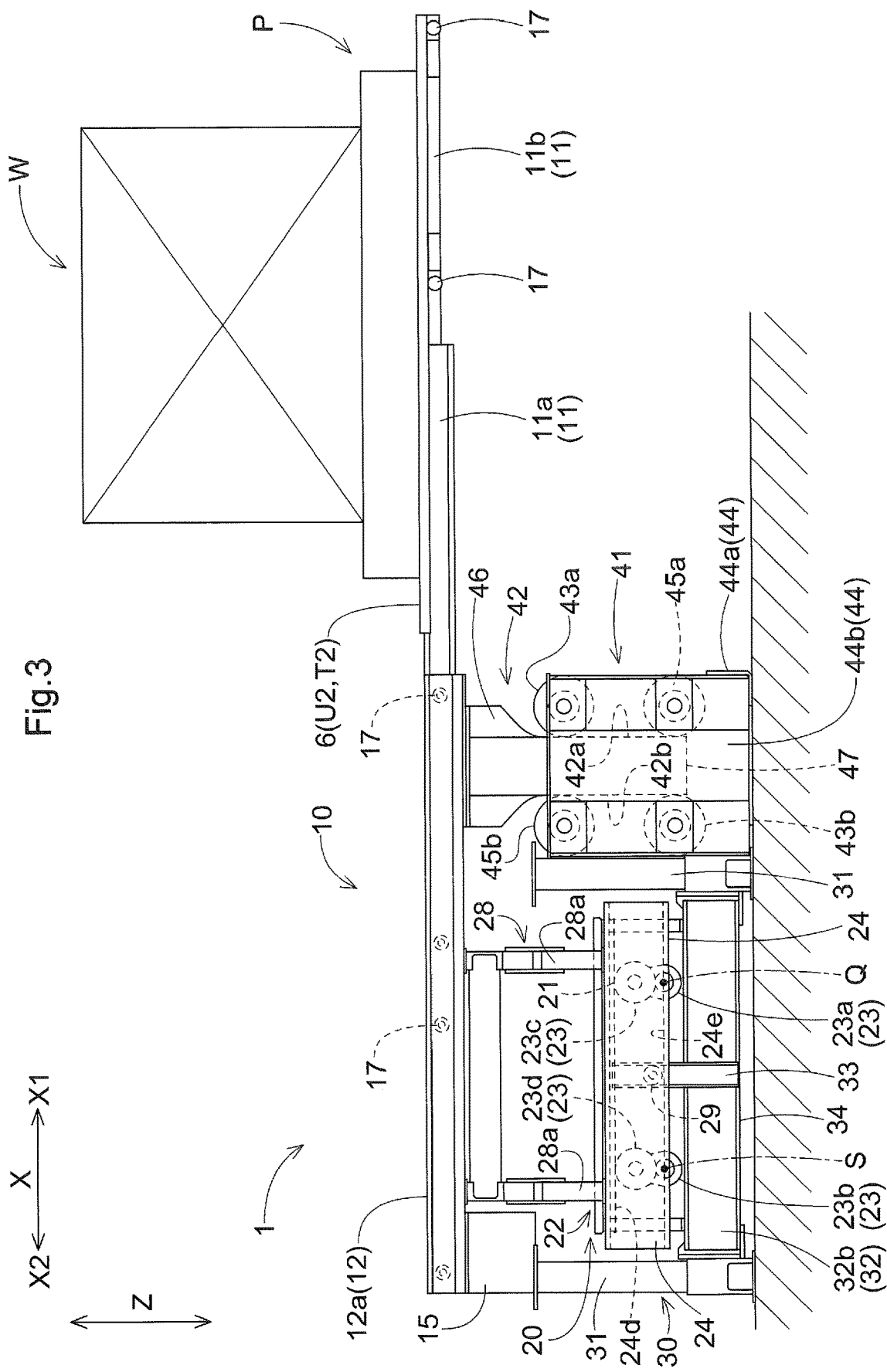
FIG. 3 is a side view of the elevating device.
Figure 4:
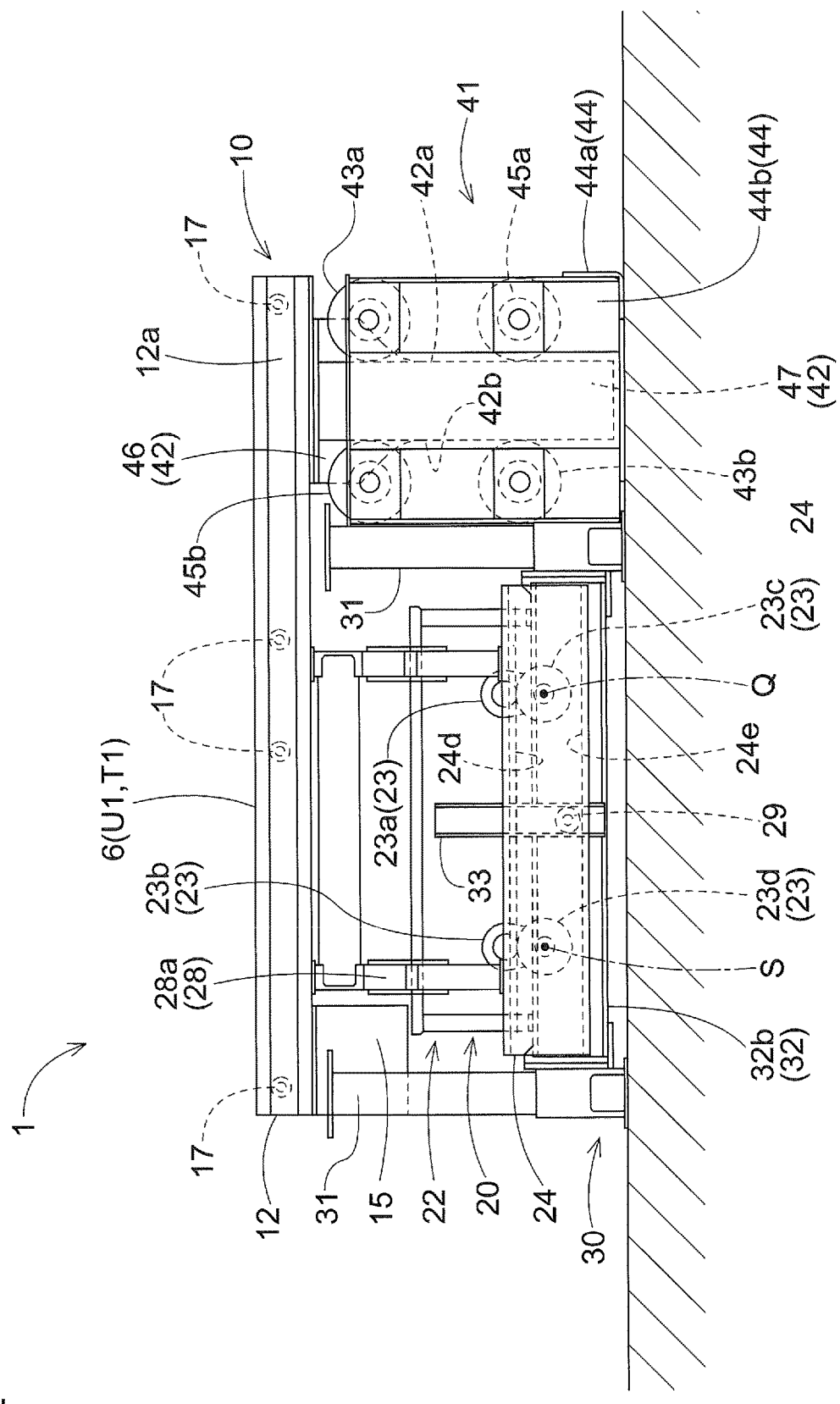
FIG. 4 is a side view of the elevating device.

The elevating device 1 includes a mount section 6 on which an article W is placeable, a protruding-retreating mechanism 10 that supports the mount section 6 and causes the mount section 6 to protrude and retreat in a protruding-retreating direction X, which extends in the horizontal direction, an elevating mechanism 20 that supports the protruding-retreating mechanism 10 and raises and lowers the protruding-retreating mechanism 10, and a base 30 that supports the elevating mechanism 20, as shown in FIGS. 2, 3, and 4. The mount section 6 in this embodiment moves upward and downward in response to the elevating mechanism 20 raising and lowering the protruding-retreating mechanism 10.

Note that, in the description of this embodiment, a direction in which the elevating mechanism 20 raises and lowers the protruding-retreating mechanism 10 is referred to as a raising-lowering direction Z, one side in the protruding-retreating direction X is referred to as a first side X1 in the protruding-retreating direction X, and the other side in the protruding-retreating direction X is referred to as a second side X2 in the protruding-retreating direction X. Further, in this embodiment, a direction orthogonal to the protruding-retreating direction X as viewed in the up-down direction is referred to as a width direction Y. The raising-lowering direction Z in this example is a direction parallel to the up-down direction, but may alternatively be slightly inclined toward the horizontal direction relative to the up-down direction (e.g., by less than five degrees). Also, the protruding-retreating direction X is a direction parallel to the horizontal direction, but may alternatively be slightly inclined toward the up-down direction relative to the horizontal direction (e.g., by less than five degrees).

The elevating device 1 in this embodiment raises and lowers the mount section 6 between a lower position T1 (see FIG. 4) to which the mount section 6 retreats below a mount surface of the loading conveyor 5 and an upper position T2 (see FIG. 3) at which the mount section 6 protrudes upward of the mount surface of the loading conveyor 5. The elevating device 1 also causes the mount section 6 to protrude and retreat between a retreat position U1 (see FIG. 4) at which the mount section 6 overlaps the elevating mechanism 20 as viewed in the up-down direction and protrusion positions U2 (see FIG. 3) at which the mount section 6 protrudes in the protruding-retreating direction X. The elevating device 1 in this example elevates a pallet P on the loading conveyor 5 that has been positioned immediately above the elevating device 1 by raising the mount section 6 to the upper position T2 from the lower position T1. The article W is thus placed on the mount section 6 via the pallet P. The elevating device 1 also moves the article W toward the first support table 3a by causing the mount section 6 to protrude to a protrusion position U2 on the first side X1 in the protruding-retreating direction X. Similarly, the elevating device 1 moves the article W toward the second support table 3b by causing the mount section 6 to protrude to a protrusion position U2 on the second side X2 in the protruding-retreating direction X. Here, the upper position T2 is a position higher than the first support table 3a and the second support table 3b. The elevating device 1 in this example can set the mount section 6 at any height between the lower position T1 and the upper position T2.

2-1. Base

The base 30 in this embodiment is installed on a floor, as shown in FIGS. 2, 3, and 4. The base 30 supports from below the elevating mechanism 20, the protruding-retreating mechanism 10, and the mount section 6. The base 30 in this example includes a plurality of columns 31, a support frame section 32, guide sections 33, and a support bottom section 34. A plurality of (here, four) columns 31 are separated from each other in the protruding-retreating direction X and the width direction Y. The columns 31 in the shown example are members extending in the raising-lowering direction Z (up-down direction) and are fixed to the floor by fastening members or the like. The four columns 31 form a rectangular shape having four vertexes that are these columns 31, as viewed in the up-down direction.

The support frame section 32 in this example connects the plurality of (here, four) columns 31 to each other. The support frame section 32 also reinforces the entire base 30. The support frame section 32 also serves to support the later-described elevating mechanism 20. The support frame section 32 in the shown example includes first support frames 32a and second support frames 32b. These are constituted by strip-shaped members. Two first support frames 32a are provided and separated from each other in the protruding-retreating direction X. Each of the two first support frames 32a connects the columns 31 next to each other in the width direction Y. Two second support frames 32b are provided and separated from each other in the width direction Y. Each of the two second support frames 32b connects the two first support frames 32a to each other. The two second support frames 32b support a later-described transmission mechanism 23 of the elevating mechanism 20 (see FIGS. 6 and 7).

The guide sections 33 guide movement of the protruding-retreating mechanism 10 in the raising-lowering direction Z. The guide sections 33 also restrict movement of a later-described elevating section 22 in the horizontal direction (see FIGS. 6 and 7). In the shown example, the guide sections 33 are guide rails extending in the raising-lowering direction Z. These guide sections 33 engage with later-described movable bodies 29. Each guide section 33 is fixed to a corresponding one of the two second support frames 32b separated in the width direction Y.

The support bottom section 34 is fixed to lower ends of the two support frames 32b. The support bottom section 34 in the shown example is a plate-shaped member. The support bottom section 34 is installed parallel to a horizontal plane and supports a later-described elevation drive source 25 from below.

2-2. Protruding-Retreating Mechanism and Mount Section

Figure 5:
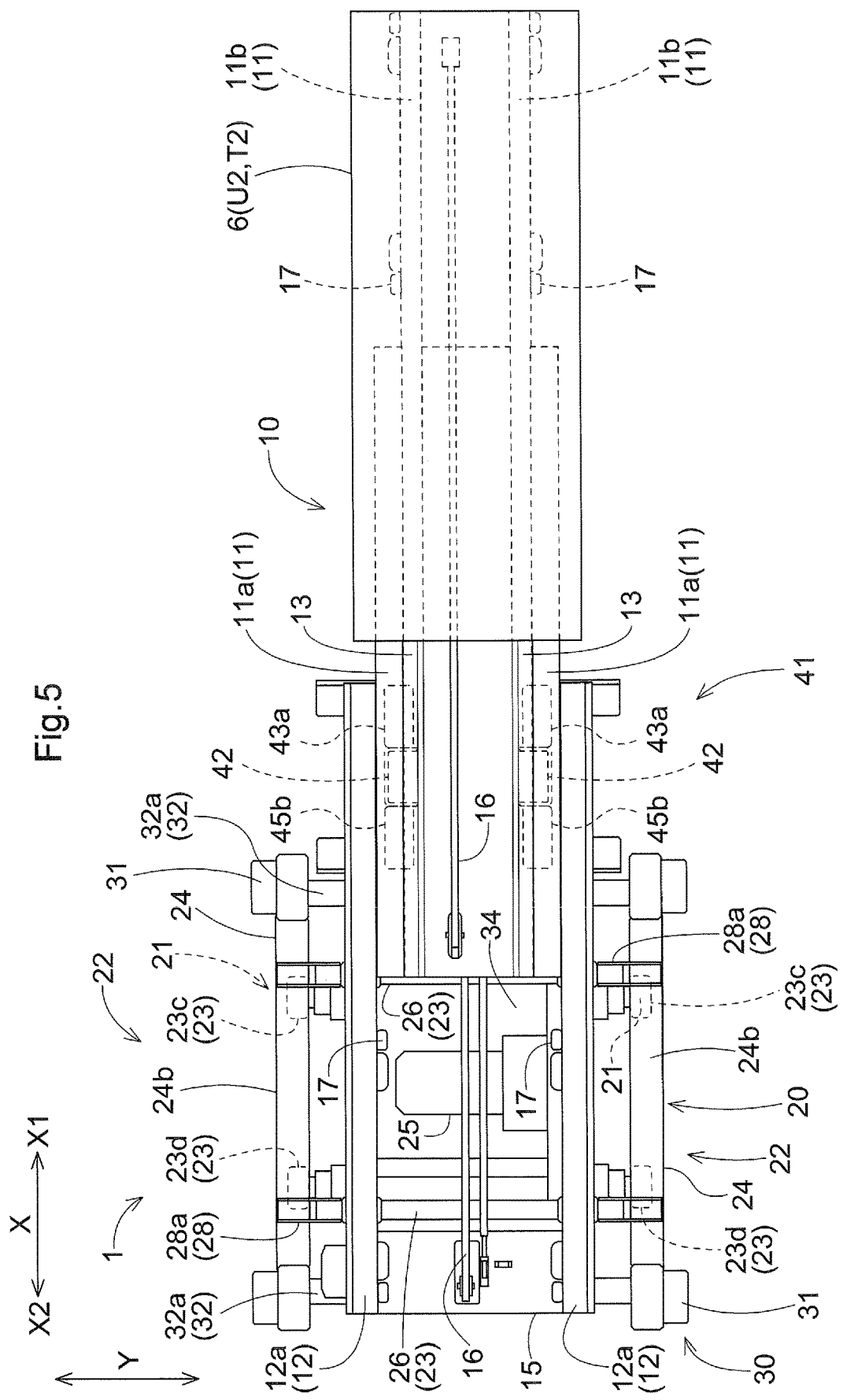
FIG. 5 is a plan view of the elevating device.

The protruding-retreating mechanism 10 in this embodiment includes a movable section 11 that operates to cause the mount section 6 to protrude and retreat in the protruding-retreating direction X, and a fixture section 12 fixed to the elevating mechanism 20, as shown in FIGS. 3 and 5. The movable section 11 in this example is slidable in the protruding-retreating direction X relative to the fixture section 12. The movable section 11 supports the mount section 6 from below. The movable section 11 protruding and retreating relative to the fixture section 12 slides the mount section 6 between the retreat positions U1 and the protrusion positions U2. The protruding-retreating mechanism 10 in this embodiment causes the mount section 6 to protrude toward the first side X1 in the protruding-retreating direction X, as shown in FIG. 3. The protruding-retreating mechanism 10 also causes the mount section 6 to protrude toward the second side X2 in the protruding-retreating direction X. In other words, the protruding-retreating mechanism 10 can cause the mount section 6 to protrude and retreat toward both sides in the protruding-retreating direction X. The protruding-retreating mechanism 10 in this example can cause the mount section 6 to protrude and retreat toward both sides in the protruding-retreating direction X regardless of the position of the mount section 6 in the up-down direction. Specific configurations of the protruding-retreating mechanism 10 and the mount section 6 will be described below.

The movable section 11 in this example includes a first movable body 11a and a second movable body 11b. The first movable body 11a is on the inner side (the side where the base 30 is located) in the protruding-retreating direction X relative to the second movable body 11b while the mount section 6 is at either protrusion position U2. The first movable body 11a slides in the protruding-retreating direction X relative to the fixture section 12. The second movable body 11b slides in the protruding-retreating direction X relative to the first movable body 11a. The mount section 6 in this example is supported by the second movable body 11b. Specifically, the mount section 6 is fixed on the second movable body 11b. Therefore, the mount section 6 integrally moves with the second movable body 11b in the protruding-retreating direction X.

The fixture section 12 in the shown example includes two fixture members 12a separated from each other in the width direction Y. The two fixture members 12a are bar-shaped members extending in the protruding-retreating direction X.

The pair of fixture members 12a is fixed to an upper end of a later-described guide support 28 of the elevating section 22. The first movable body 11a slides toward both sides in the protruding-retreating direction X while being guided by the pair of fixture members 12a. Specifically, a plurality of guide rollers 17 are attached to faces of the two fixture members 12a that face inward in the width direction Y. Each of the guide rollers 17 is rotatable about a rotation axis extending in the width direction Y. The first movable body 11a moves in the protruding-retreating direction X relative to the pair of fixture members 12a by engaging with the plurality of guide rollers 17. Here, the first movable body 11a is constituted by a plate-shaped member. An upper face of the first movable body 11a has a pair of guide rail sections 13 that are recessed and extend in the protruding-retreating direction X. The second movable body lib includes a pair of engaging members, which engage with the pair of guide rail sections 13. The pair of engaging members also has a plurality of guide rollers 17. The plurality of guide rollers 17 roll on the pair of guide rail sections 13. This type of configuration allows the second movable body lib to move in the protruding-retreating direction X relative to the first movable body 11a (see FIGS. 3 and 5). The mount section 6 is fixed to this pair of engaging members. The mount section 6 is a plate-shaped member parallel to a horizontal plane and is fixed to faces of the two engaging members that face upward.

The protruding-retreating mechanism 10 in this embodiment includes a protruding-retreating drive source 15 for moving the movable section 11 in the protruding-retreating direction X, and a protruding-retreating drive 16, as shown in FIG. 5. The protruding-retreating drive source 15 in this example is connected to the protruding-retreating drive 16. The protruding-retreating drive 16 is driven by the driving force of the protruding-retreating drive source 15 and slides the movable body 11 (the first movable body 11a and the second movable body lib) in the protruding-retreating direction X.

2-3. Elevating Mechanism

The elevating mechanism 20 supports the protruding-retreating mechanism 10 from below and raises and lowers the protruding-retreating mechanism 10 in the raising-lowering direction Z, as shown in FIGS. 3 and 4. Here, the elevating mechanism 20 includes first support sections 21. The first support sections 21 are sections of the elevating mechanism 20 that support the protruding-retreating mechanism 10, as shown in FIGS. 3 and 8. In this embodiment, a moment acts on the protruding-retreating mechanism 10 (i.e., occurs on the protruding-retreating mechanism 10) with each first support section 21 serving as a fulcrum while the mount section 6 is protruding in the protruding-retreating direction X relative to the elevating mechanism 20. Specifically, a moment acts on the protruding-retreating mechanism 10 with each first support section 21 serving as a fulcrum due to a load in the up-down direction that acts on the mount section 6. Although the details will be described later, in this embodiment, the portions of the elevating mechanism 20 that serve as the first support sections 21 change in accordance with the state of the elevating device 1 (specifically, in accordance with the direction in which the mount section 6 protrudes relative to the elevating mechanism 20). The following description is of a specific configuration of the elevating mechanism 20 including the first support sections 21.

Figure 6:
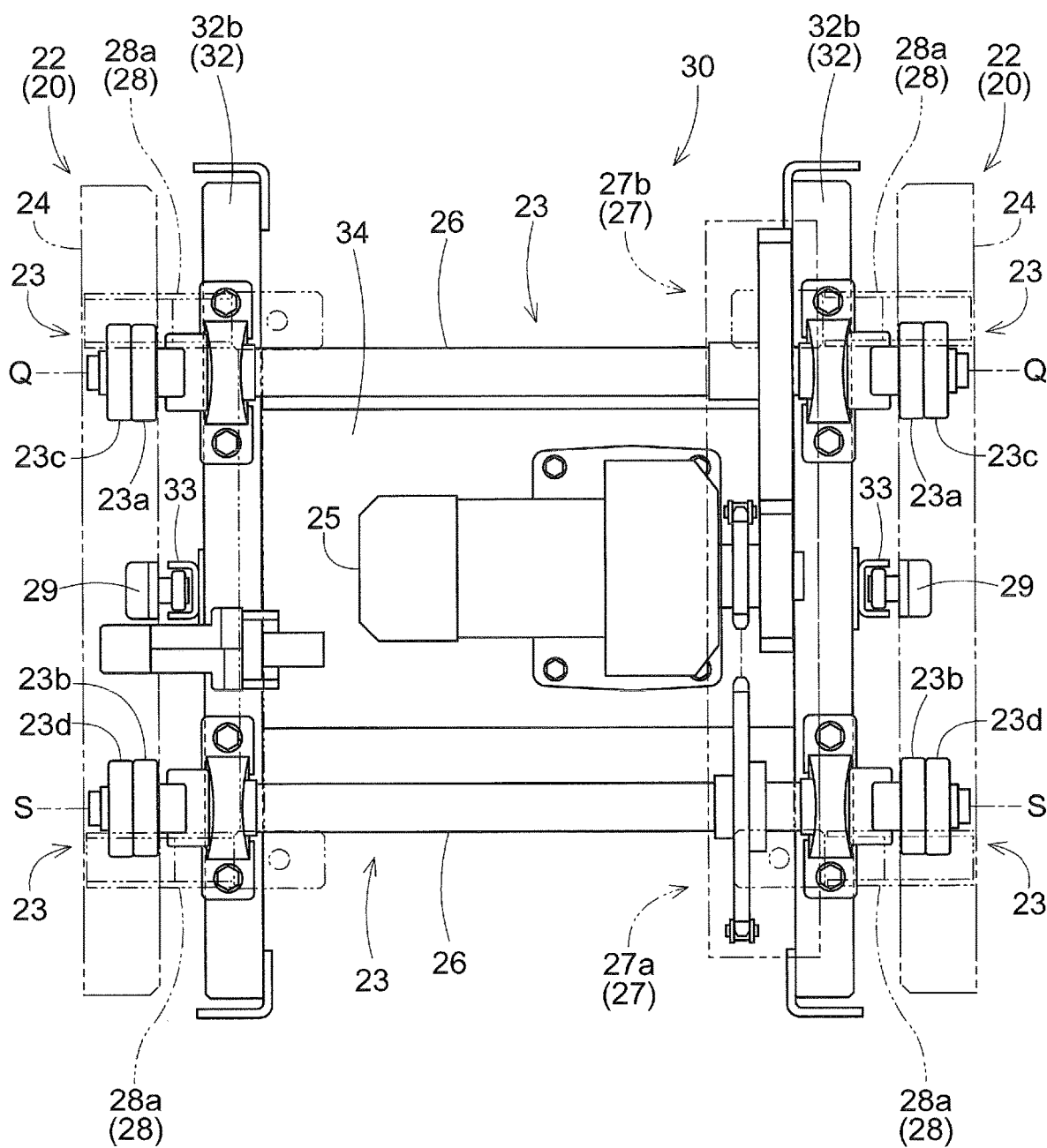
FIG. 6 is a plan view of an elevating mechanism and a base.
Figure 7:
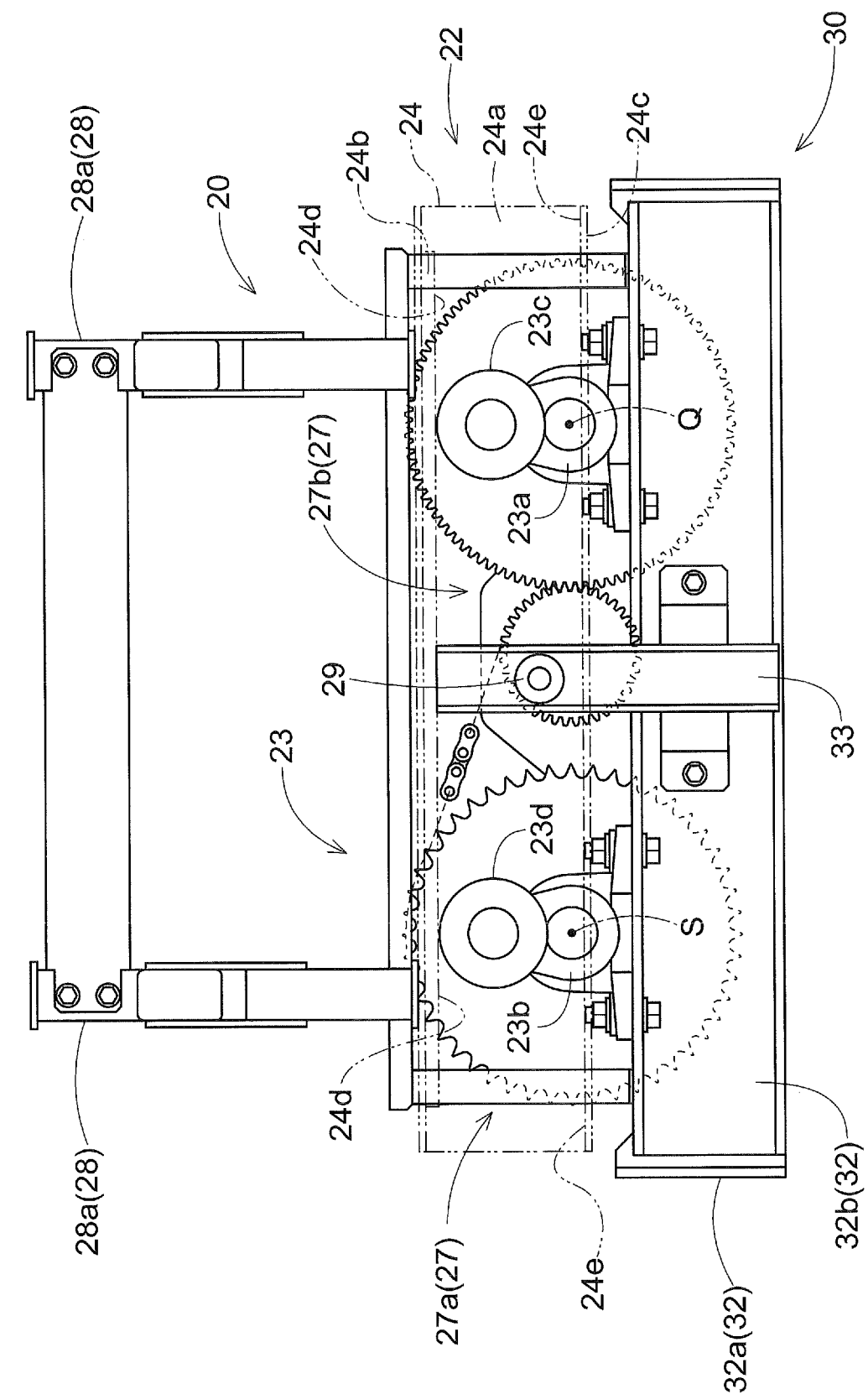
FIG. 7 is a side view of the elevating mechanism and the base.

The elevating mechanism 20 in this embodiment includes the elevation drive source 25, the elevating section 22 that moves upward and downward together with the protruding-retreating mechanism 10, and the transmission mechanism 23 that transmits the driving force of the elevation drive source 25 to the elevating section 22, as shown in FIGS. 6 and 7. The elevation drive source 25 in this example is supported by the base 30. The elevation drive source 25 in the shown example is fixed to the support bottom section 34 of the base 30 (see FIGS. 5 and 6). Note that the elevation drive source 25 in this example is constituted by an electric motor.

The transmission mechanism 23 includes first arms 23a that are driven to rotate about a first turning axis Q by the elevation drive source 25, and first idle rollers 23c each of which is rotatably supported by a corresponding first arm 23a at a position separated from the first turning axis Q in the radial direction (a direction orthogonal to the first turning axis Q), as shown in FIGS. 6 and 7. The transmission mechanism 23 in this example also includes drive shafts 26 that are driven to rotate by the elevation drive source 25, and a link mechanism 27 that connects the elevation drive source 25 to the drive shafts 26. The drive shafts 26 in this example are connected to a drive motor serving as the elevation drive source 25, via the link mechanism 27. Therefore, each drive shaft 26 is driven to rotate about an axis by the elevation drive source 25. In the shown example, two drive shafts 26 are provided and separated from each other in the protruding-retreating direction X. Each of the two drive shafts 26 is supported by the base 30 while extending in the width direction Y. The two drive shafts 26 are supported by the pair of second support frames 32b in such a manner as to be rotatable about respective axes extending in the width direction Y. Both ends of the drive shafts 26 in the example in FIG. 6 are connected to the pair of second support frames 32b. Here, each of the two drive shafts 26 is rotated about a corresponding axis extending in the width direction Y by one elevation drive source 25. The two drive shafts 26 are connected to the elevation drive source 25 via the link mechanism 27. The link mechanism 27 includes a chain transmission mechanism 27a and a gear transmission mechanism 27b. The chain transmission mechanism 27a transmits the driving force of the elevation drive source 25 to one of the two drive shafts 26. The gear transmission mechanism 27b transmits the driving force of the elevation drive source 25 to the other one of the two drive shafts 26. The two drive shafts 26 rotate in the opposite directions.

The first arms 23a are attached to one of the drive shafts 26. Specifically, the first arms 23a are attached to respective end regions of the drive shaft 26 on the first side X1 in the protruding-retreating direction X, of the two drive shafts 26. The first idle rollers 23c are attached to leading ends (ends on the side separated from the first turning axis Q) of the respective first arms 23a. Here, the first turning axis Q is a rotation axis of the drive shaft 26 on the first side X1 in the protruding-retreating direction X, as shown in FIG. 7. That is, the first arms 23a integrally rotate with the drive shaft 26 on the first side X1 in the protruding-retreating direction X. The first arms 23a in the shown example are attached to the respective end sides of the drive shaft 26 on the first side X1 in the protruding-retreating direction X. In other words, the two first arms 23a are separated from each other in the width direction Y. Each first idle roller 23c is attached to a corresponding one of the two first arms 23a. That is, the transmission mechanism 23 includes a pair of first idle rollers 23c and a pair of first arms 23a. Note that each first arm 23a corresponds to an "arm", each first idle roller 23c corresponds to an "idle roller", and the first turning axis Q corresponds to a "turning axis".

The transmission mechanism 23 in the present embodiment also includes second arms 23b that are separated from the first arms 23a toward the second side X2 in the protruding-retreating direction X and driven to rotate about a second turning axis S by the elevation drive source 25, and second idle rollers 23d that are rotatably supported by the second arms 23b at positions separated from the second turning axis S in the radial direction (a direction orthogonal to the second turning axis 5), as shown in FIGS. 6 and 7. The second arms 23b in this example are attached to the other one of the drive shafts 26. Specifically, the second arms 23b are attached to respective end regions of the drive shaft 26 on the second side X2 in the protruding-retreating direction X, of the two drive shafts 26. The second idle rollers 23d are attached to leading ends (ends on the side separated from the second turning axis 5) of the respective second arms 23b. Here, the second turning axis S is a rotation axis of the drive shaft 26 on the second side X2 in the protruding-retreating direction X, as shown in FIG. 7. That is, the second arms 23b integrally rotate with the drive shaft 26 on the second side X2 in the protruding-retreating direction X. The second arms 23b in the shown example are attached to the respective end sides of the drive shaft 26 on the second side X2 in the protruding-retreating direction X. That is, two second arms 23b are separated from each other in the width direction Y. Each second idle roller 23d is attached to a corresponding one of the two second arms 23b. That is, the transmission mechanism 23 includes a pair of second idle rollers 23d and a pair of second arms 23b.

The elevating section 22 includes recessed guides 24 that are orthogonal to the first turning axis Q, extend in the horizontal direction, and engage with the first idle rollers 23c, as shown in FIGS. 3, 4, and 7. The recessed guides 24 in this example are parallel to the protruding-retreating direction X. Further, the recessed guides 24 are also orthogonal to the second turning axis S. The second idle rollers 23d also engage with the recessed guides 24.

The recessed guides 24 in this example are plate-shaped members. Each recessed guide 24 includes a guide body 24a, a guide upper section 24b, and a guide lower section 24c (see FIGS. 7 and 8). The guide body 24a extends in the protruding-retreating direction X and is parallel to the up-down direction. The guide upper section 24b extends inward (toward the side where the elevation drive source 25 is located) in the width direction Y from an upper end of the guide body 24a. The guide lower section 24c extends inward in the width direction Y from a lower end of the guide body 24a. The guide upper section 24b and the guide lower section 24c are parallel to a horizontal plane and face each other in the up-down direction. The guide body 24a, the guide upper section 24b, and the guide lower section 24c are integrated in the shown example.

Each recessed guide 24 in this embodiment includes an upper opposing face 24d that opposes from above a corresponding one of the first idle rollers 23c and a corresponding one of the second idle rollers 23d, and a lower opposing face 24e that opposes from below a corresponding one of the first idle rollers 23c and a corresponding one of the second idle rollers 23d, as shown in FIGS. 7 and 8. The upper opposing face 24d in this example is a face of the guide upper section 24b that faces downward, and the lower opposing face 24e is a face of the guide lower section 24c that faces upward. The first idle roller 23c coming into contact with the upper opposing face 24d allows the recessed guide 24 to engage with the first idle roller 23c. Similarly, the second idle roller 23d coming into contact with the upper opposing face 24d allows the recessed guide 24 to engage with the second idle roller 23d.

In the shown example, two recessed guides 24 are provided and separated from each other in the width direction Y (see long-dash double-dot lines in FIG. 6). Each of the two recessed guides 24 engages with one first idle roller 23c and one second idle roller 23d. That is, one first idle roller 23c and one second idle roller 23d come into contact with the upper opposing face 24d of each of the two recessed guides 24. Therefore, both the first idle roller 23c and the second idle roller 23d support each recessed guide 24 from below while the mount section 6 is at the retreat position U1 (see FIGS. 6 and 7). More specifically, each first idle roller 23c supports the corresponding recessed guide 24 at a position on the first side X1 in the protruding-retreating direction X relative to the second idle roller 23d, and each second idle roller 23d supports the corresponding recessed guides 24 at a position on the second side X2 in the protruding-retreating direction X relative to the first idle roller 23c (see FIG. 4).

The recessed guides 24 in this example are provided with movable bodies 29 capable of moving in the raising-lowering direction Z while being guided by the aforementioned guide sections 33. Each movable body 29 in the shown example is fixed to a corresponding one of the two guide lower sections 24c. The movable bodies 29 are installed while engaging with the guide sections 33 (guide rails).

The first support sections 21 in this embodiment are contact areas between the first idle rollers 23c and the respective recessed guides 24, as shown in FIGS. 3 and 8. Specifically, a contact area between each first idle roller 23c and the corresponding recessed guide 24 serves as a first support section 21 while the mount section 6 is protruding toward the first side X1 in the protruding-retreating direction X. The first support sections 21 in this example are contact areas between the first idle rollers 23c and the respective upper opposing faces 24d. Here, a moment acts on the protruding-retreating mechanism 10 with each of the contact areas between the first idle rollers 23c and the upper opposing faces 24d serving as a fulcrum while the mount section 6 is protruding toward the first side X1 in the protruding-retreating direction X. Also, the first support sections 21 in this embodiment are contact areas between the second idle rollers 23d and the respective recessed guides 24 while the mount section 6 is protruding toward the second side X2 in the protruding-retreating direction X. Specifically, the first support sections 21 are contact areas between the second idle rollers 23d and the respective upper opposing faces 24d. That is, in this case, a moment acts on the protruding-retreating mechanism 10 with each of the contact areas between the second idle rollers 23d and the upper opposing faces 24d serving as a fulcrum. In this example, a pallet P and an article W are placed on the mount section 6. Therefore, not only a load of the mount section 6 itself but also a load of the pallet P and the article W act on the mount section 6. For this reason, the moment that acts on the protruding-retreating mechanism 10 is a moment that acts on the protruding-retreating mechanism 10 (i.e., that occurs on the protruding-retreating mechanism 10) due to the load in the up-down direction that acts on the mount section 6.

In the example in FIG. 6, the spacing between the two recessed guides 24 is wider than the spacing between the two support frames 32b. That is, the two recessed guides 24 that move upward and downward in the raising-lowering direction Z are on the outer side in the width direction Y relative to the respective second support frames 32b of the base 30. Therefore, the two recessed guides 24 move in the raising-lowering direction Z at positions on the outer side relative to the respective second support frames 32b.

The elevating section 22 in this example also includes a guide support 28. The guide support 28 supports the recessed guides 24 from above and supports the protruding-retreating mechanism 10 from below. In other words, the guide support 28 connects the recessed guides 24 to the protruding-retreating mechanism 10. The aforementioned fixture section 12 of the protruding-retreating mechanism 10 is fixed to an upper end of the guide support 28. The recessed guides 24 are fixed to a lower end of the guide support 28. The guide support 28 in the shown example includes a plurality of (here, four) guide supporters 28a for supporting the pair of recessed guides 24 from above. The plurality of guide supporters 28a are fixed to the guide upper sections 24b of the recessed guides 24 and support the protruding-retreating mechanism 10 from below.

The above-described configuration enables the elevating mechanism 20 to raise and lower the protruding-retreating mechanism 10 (in the raising-lowering direction Z). That is, the two drive shafts 26 are driven to rotate in the opposite directions by the elevation drive source 25. This rotates the first arms 23a and the second arms 23b in the opposite directions. Then, the rotation of the first arms 23a and the second arms 23b raises and lowers the recessed guides 24. As a result, the guide support 28 connected to the recessed guides 24 and the protruding-retreating mechanism 10 supported by the guide support 28 can also move upward and downward. This type of configuration enables the elevating mechanism 20 to raise and lower the mount section 6 supported by the protruding-retreating mechanism 10, between the lower position T1 and the upper position T2.

3. Second Support Section

The elevating device 1 also includes a second support section 41 that is separate from the first support sections 21 and supports the protruding-retreating mechanism 10, as shown in FIGS. 2, 3, and 4. The second support section 41 in this embodiments is independent of the elevating mechanism 20 and the base 30 that supports the elevating mechanism 20. The second support section 41 allows the elevating mechanism 20 to raise and lower the protruding-retreating mechanism 10, and supports a moment that acts on the protruding-retreating mechanism 10 with each first support section 21 serving as a fulcrum. The second support section 41 in this embodiment supports the moment that acts on the protruding-retreating mechanism 10 due to a load in the up-down direction that acts on the mount section 6 while the mount section 6 is protruding in the protruding-retreating direction X (toward the first side X1 or the second side X2 in the protruding-retreating direction X). A specific configuration of the second support section 41 will be described below.

The second support section 41 in this embodiment is connected to the fixture section 12, as shown in FIGS. 2, 3, and 4. That is, the second support section 41 supports the fixture section 12 of the protruding-retreating mechanism 10 from below. The second support section 41 in this example is adjacent to the elevating mechanism 20 and the base 30. The second support section 41 is at a position overlapping the fixture section 12 as viewed in the up-down direction. The second support section 41 in the shown example is on the first side X1 in the protruding-retreating direction X relative to the elevating mechanism 20 and the base 30. Note that the position of the second support section 41 is not specifically limited as long as the second support section 41 is in an area where it can appropriately support the fixture section 12. For example, the second support section 41 may alternatively be on the second side X2 in the protruding-retreating direction X relative to the elevating mechanism 20 and the base 30. Alternatively, the second support section 41 may be on the outer side in the width direction Y relative to the elevating mechanism 20 and the base 30.

The second support section 41 in this embodiment includes supported members 42 that are fixed to the protruding-retreating mechanism 10 and extend in the raising-lowering direction Z, as shown in FIGS. 2, 3, and 4. The supported members 42 in this example are fixed to the fixture section 12 of the protruding-retreating mechanism 10. Specifically, the supported members 42 are fixed to a face of the fixture section 12 that faces downward. The supported members 42 extend downward from the face of the fixture section 12 that faces downward. Also, the supported members 42 in this example are at positions adjacent to the elevating mechanism 20 and the base 30. The supported members 42 in the shown example are on the first side X1 in the protruding-retreating direction X relative to the elevating mechanism 20 and the base 30. Each supported member 42 includes a fixed section 46 and a bar-shaped body 47. These members are integrated. The fixed section 46 is fixed to the face of the fixture section 12 that faces downward. The fixed section 46 in one example in FIG. 3 has a trapezoidal shape having slopes that expand in the protruding-retreating direction X while extending upward as viewed in the width direction Y. The bar-shaped body 47 has a rectangular-parallelepiped shape and extends downward from a face (bottom face) of the fixed section 46 that faces downward. Here, the dimension of each supported member 42 in the up-down direction is the same as or smaller than the height at which the fixture section 12 is located while the mount section 6 is at the lower position T1 (see FIG. 4). That is, the lower ends of the supported members 42 are positioned above the floor surface in response to the mount section 6 moving upward in the raising-lowering direction Z (see FIG. 3). In one example in FIG. 2, two supported members 42 are provided and separated from each other in the width direction Y. That is, a pair of supported members 42 is fixed to the fixture section 12.

The second support section 41 in this embodiment includes first rollers 43a, each of which is disposed in such a manner as to come into contact with a first face 42a of a corresponding supported member 42 that faces the first side X1 in the protruding-retreating direction X, and second rollers 43b, each of which is disposed in such a manner as to come into contact with a second face 42b of a corresponding supported member 42 that faces the second side X2 in the protruding-retreating direction X below the first rollers 43a, as shown in FIGS. 3 and 4. The second support section 41 also includes a roller support 44 that rotatably supports the first rollers 43a and the second rollers 43b while fixing the positions of the rotation axes of the first rollers 43a and the second rollers 43b relative to the base 30. This type of configuration enables the second support section 41 to allow upward and downward movement of the supported members 42 and also support the moment that acts on the supported members 42 while the mount section 6 is protruding toward the first side X1 in the protruding-retreating direction X.

The first rollers 43a and the second rollers 43b in this example are rotatably supported about the respective rotation axes extending in the width direction Y by the roller support 44. The first rollers 43a and the second rollers 43b are separated from each other in the protruding-retreating direction X and the up-down direction. Specifically, the first rollers 43*a* are above the second rollers 43*b* and on the first side X1 in the protruding-retreating direction X relative to the second rollers 43*b*. The spacing between each first roller 43*a* and a corresponding second roller 43*b* as viewed in the raising-lowering direction Z is a spacing corresponding to the dimension of each supported member 42 in the protruding-retreating direction X. Therefore, the supported member 42 supported from above by the fixture section 12 can be disposed between the first roller 43*a* and the second roller 43*b* such that the supported member 42 can move upward and downward.

The second support section 41 in this embodiment also includes third rollers 45*a* that are disposed in such a manner as to come into contact with the first face 42*a* below the first rollers 43*a*, and fourth rollers 45*b* that are disposed in such a manner as to come into contact with the second face 42*b* above the third rollers 45*a*, as shown in FIGS. 3 and 4. Also, the roller support 44 rotatably supports the third rollers 45*a* and the fourth rollers 45*b* while fixing the positions of the rotation axes of the third rollers 45*a* and the fourth rollers 45*b* relative to the base 30. This type of configuration enables the second support section 41 to allow upward and downward movement of the supported members 42 and also support the moment that acts on the supported members 42 while the mount section 6 is protruding toward the second side X2 in the protruding-retreating direction X.

The third rollers 45*a* and the fourth rollers 45*b* in this example are rotatably supported about the respective rotation axes extending in the width direction Y by the roller support 44. The third rollers 45*a* and the fourth rollers 45*b* are separated from each other in the protruding-retreating direction X and the up-down direction. Specifically, the fourth rollers 45*b* are above the third rollers 45*a* and on the second side X2 in the protruding-retreating direction X relative to the third rollers 45*a*. The third rollers 45*a* are below the first rollers 43*a* and at the same positions in the protruding-retreating direction X and the width direction Y as those of the first rollers 43*a*. The fourth rollers 45*b* are at the same positions in the protruding-retreating direction X and the width direction Y as those of the second rollers 43*b*. The spacing between each third roller 45*a* and a corresponding fourth roller 45*b* as viewed in the raising-lowering direction Z is a spacing corresponding to the dimension of each supported member 42 in the protruding-retreating direction X. The fourth rollers 45*b* in the shown example are above the second rollers 43*b*. The fourth rollers 45*b* are at the same positions in the up-down direction as those of the first rollers 43*a*. The third rollers 45*a* are at the same positions in the up-down direction as those of the second rollers 43*b* (see FIGS. 3 and 4). Thus, in the shown example, the pair of the first rollers 43*a* and the second rollers 43*b* and the pair of the third rollers 45*a* and the fourth rollers 45*b* can be disposed in an alternate manner on the two sides in the protruding-retreating direction X while overlapping the regions in the up-down direction where these pairs are disposed. Therefore, the dimension of the second support section 41 in the up-down direction can be reduced more easily than in the case where, for example, the third rollers 45*a* and the fourth rollers 45*b* are below the first rollers 43*a* and the second rollers 43*b*. Accordingly, an increase in the size of the second support section 41 can be avoided.

The supported members 42 in this example are disposed between the rollers adjacent to each other in the protruding-retreating direction X in such a manner as to be movable upward and downward (see FIG. 2). Each first roller 43*a* and each third roller 45*a* come into contact with the first face 42*a* of the corresponding supported member 42. Each second roller 43*b* and each fourth roller 45*b* come into contact with the second face 42*b* of the corresponding supported member 42. The first face 42*a* in this example is a face of the bar-shaped body 47 that faces the first side X1 in the protruding-retreating direction X, and the second face 42*b* is a face of the bar-shaped body 47 that faces the second side X2 in the protruding-retreating direction X (see FIGS. 3 and 4). The shown example provides two first rollers 43*a* separated from each other in the width direction Y, two second rollers 43*b* separated from each other in the width direction Y, two third rollers 45*a* separated from each other in the width direction Y, and two fourth rollers 45*b* separated from each other in the width direction Y (see FIG. 2). Also, two supported members 42 are disposed in correspondence with the rollers of the respective pairs.

In this type of configuration, the moment that acts on the protruding-retreating mechanism 10 with each first support section 21 serving as a fulcrum is supported by the pair of first rollers 43*a* and the pair of second rollers 43*b* while the mount section 6 is protruding toward the first side X1 in the protruding-retreating direction X. That is, the moment that acts on the protruding-retreating mechanism 10 with each first support section 21 serving as a fulcrum is supported by the second support section 41 (specifically, the roller support 44) via the contact areas between the first rollers 43*a* and the first faces 42*a* and the contact areas between the second rollers 43*b* and the second faces 42*b*. Further, the moment that acts on the protruding-retreating mechanism 10 with each first support section 21 serving as a fulcrum is supported by the pair of third rollers 45*a* and the pair of fourth rollers 45*b* while the mount section 6 is protruding toward the second side X2 in the protruding-retreating direction X. That is, the moment that acts on the protruding-retreating mechanism 10 with each first support section 21 serving as a fulcrum is supported by the second support section 41 (specifically, the roller support 44) via the contact areas between the third rollers 45*a* and the first faces 42*a* and the contact areas between the fourth rollers 45*b* and the second faces 42*b*.

The roller support 44 in one example in FIG. 2 includes a roller support frame 44*a* that is fixed to the floor, and a pair of roller support members 44*b*. The two roller support members 44*b* are separated from each other in the width direction Y. The pair of roller support members 44*b* are fixed to the roller support frame 44*a*. Each of the two roller support members 44*b* is a rectangular-parallelepiped member extending in the protruding-retreating direction X and the up-down direction. The first rollers 43*a*, the second rollers 43*b*, the third rollers 45*a*, and the fourth rollers 45*b* are rotatably supported about respective rotation axes extending in the width direction Y by faces of the two roller support members 44*b* that face inward in the width direction Y.

Note that members that come into contact with the first faces 42*a* and the second faces 42*b* of the supported members 42 in this embodiment are rollers that rotate about respective axes extending in the width direction Y, but may alternatively be elastic members or the like instead of rollers.

As shown in FIG. 8, the second idle roller 23*d* in this embodiment is separated from the lower opposing face 24*e* while the mount section 6 is protruding toward the first side X1 in the protruding-retreating direction X and the first idle roller 23*c* is in contact with the upper opposing face 24*d* from below and supporting the protruding-retreating mechanism 10. In this example, a small gap is formed between the first face 42*a* of the supported member 42 and the first roller 43a and between the first face 42a and the third roller 45a while the mount section 6 is at the retreat position U1. Similarly, a small gap is formed between the second face 42b and the second roller 43b and between the second face 42b and the fourth roller 45b while the mount section 6 is at the retreat position U1. Such backlashes (gaps, clearances) in the second support section 41 slightly inclines the protruding-retreating mechanism 10 downward due to the moment that acts on the protruding-retreating mechanism 10 with the first support section 21 (here, the contact area between the first idle roller 23c and the upper opposing face 24d) serving as a fulcrum due to a load in the up-down direction that acts on the mount section 6 while the mount section 6 is protruding toward the first side X1 in the protruding-retreating direction X. The guide support 28 and the recessed guide 24 that support the protruding-retreating mechanism 10 from below are also slightly inclined, following the protruding-retreating mechanism 10. In this embodiment, the width of the recessed guide 24 in the up-down direction (specifically, the spacing between the upper opposing face 24d and the lower opposing face 24e) is larger than the diameter of the second idle roller 23d. Further, the amount of upward displacement of the lower opposing face 24e due to the backlashes in the second support section 41 (the amount of displacement from the state where the mount section 6 is at the retreat position U1) is smaller than the gap between the second idle roller 23d and the lower opposing face 24e while the mount section 6 is at the retreat position U1. Accordingly, the second idle roller 23d does not come into contact with the lower opposing face 24e even if the protruding-retreating mechanism 10 is inclined downward as a result of the mount section 6 protruding toward the first side X1 in the protruding-retreating direction X. In the example shown in FIG. 8, the spacing r between an upper end of the second idle roller 23d and the upper opposing face 24d is smaller than the spacing s between a lower end of the second idle roller 23d and the lower opposing face 24e while the mount section 6 is protruding toward the first side X1 in the protruding-retreating direction X (r<s). Similarly, the first idle roller 23c is separated from the lower opposing face 24e while the mount section 6 is protruding toward the second side X2 in the protruding-retreating direction X and the second idle roller 23d is in contact with the upper opposing face 24d from below and supporting the protruding-retreating mechanism 10. In this case, the first support section 21 is the contact area between the second idle roller 23d and the upper opposing face 24d. Note that the example in the figures schematically show the spacing between each roller and the supported member 42 in an enlarging manner, but a very small gap is formed in reality.

4. Other Embodiments

Next, other embodiments of the elevating device 1 will be described.

Figure 13:
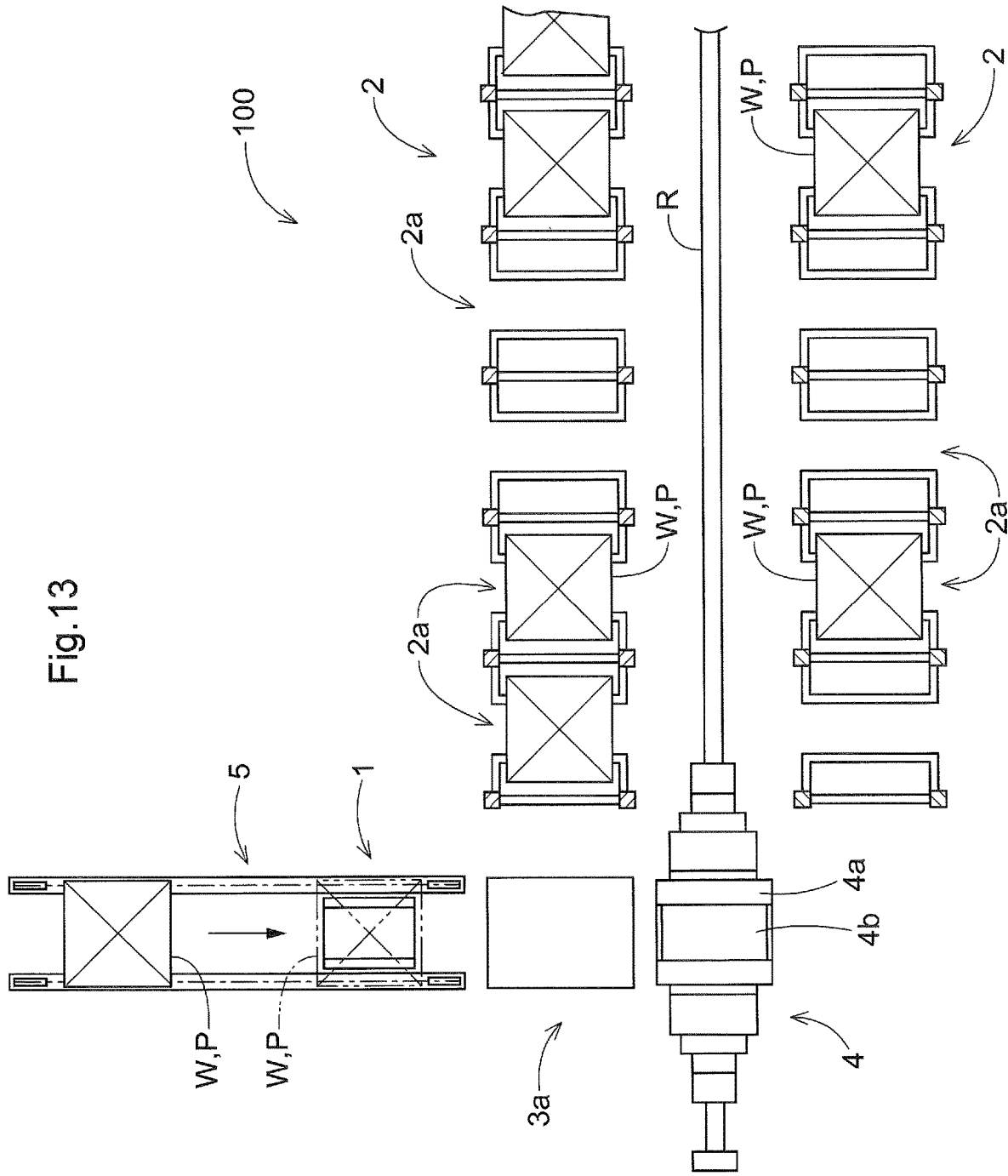
FIG. 13 is a plan view of the automated warehouse according to another embodiment.
Figure 14:
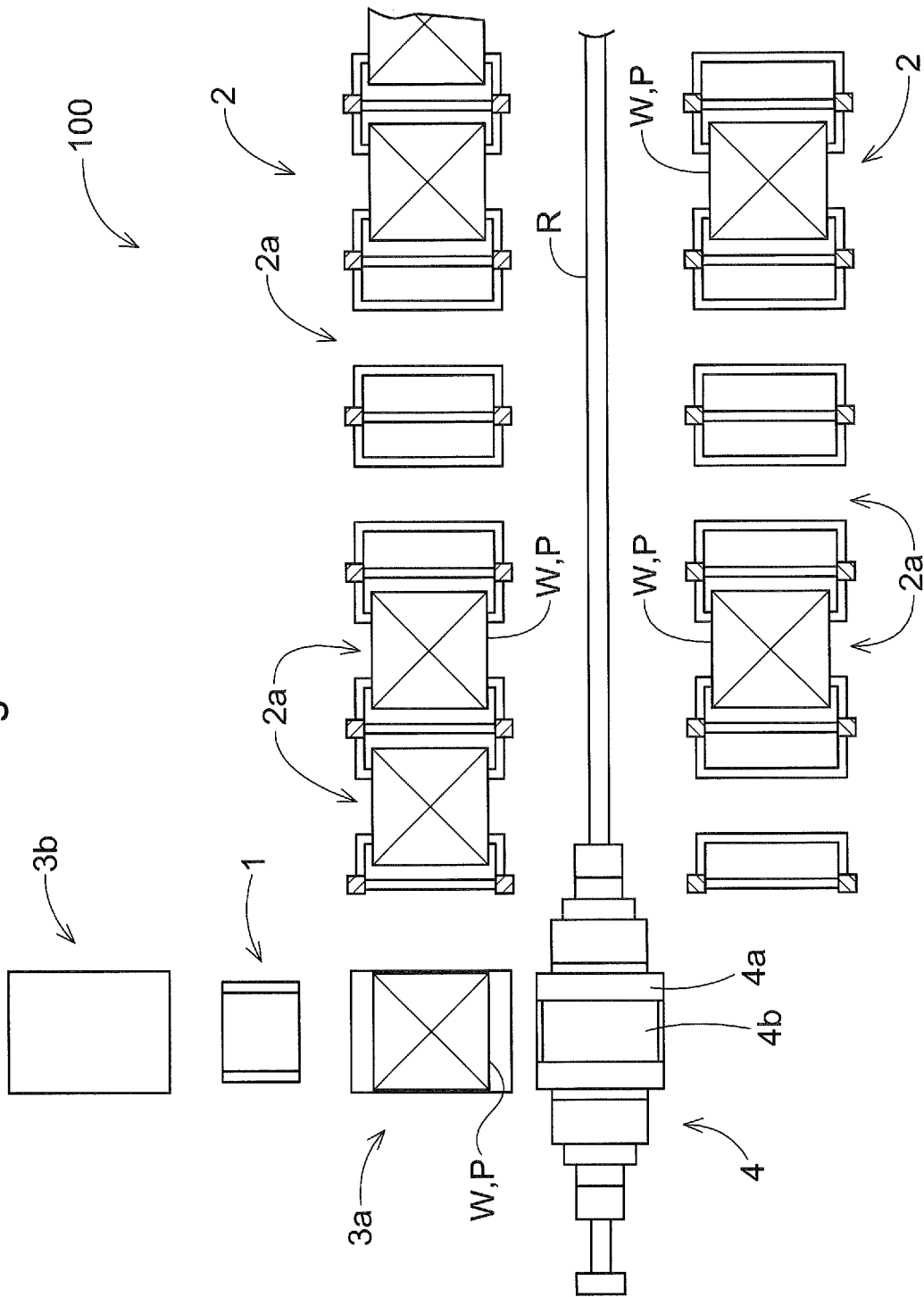
FIG. 14 is a plan view of the automated warehouse according to another embodiment.

(1) The above embodiment has described, as an example, a configuration where the elevating device 1 delivers an article W received from the loading conveyor 5 to the first support table 3a and delivers an article W received from the first support table 3a to the second support table 3b. However, the elevating device 1 is not limited to this configuration. For example, the elevating device 1 may alternatively serve only to deliver an article W received from the loading conveyor 5 to the first support table 3a. FIG. 13 shows an example of this type of configuration. The loading conveyor 5 in FIG. 13 is parallel to in a direction in which the protruding-retreating section 4b of the transport device 4 protrudes and retreats. The elevating device 1 is in an end region of the loading conveyor 5 on the side where the transport device 4 is located. Furthermore, the elevating device 1 is at a position adjacent to the first support table 3a. The elevating device 1, after receiving an article W from the loading conveyor 5, causes the mount section 6 to protrude toward the first support table 3a and delivers this article W to the first support table 3a. Thus, the elevating device 1 may cause the mount section 6 to protrude and retreat toward only one side in the protruding-retreating direction X. Alternatively, the elevating device 1 may deliver articles W between the first support table 3a and the second support table 3b without use of a conveyor. FIG. 14 shows an example of this type of configuration. The automated warehouse 100 in FIG. 14 does not include the loading conveyor 5. The elevating device 1 delivers articles W between the first support table 3a and the second support table 3b. That is, the loading conveyor 5 need not necessarily be provided in the configuration where the mount section 6 protrudes and retreats toward both sides in the protruding-retreating direction X. In this case, for example, a plurality of automatic guided vehicles (AGVs) may travel in the automated warehouse 100. That is, the AGVs may transport an articles W from outside FIG. 14 to the second support table 3b and transport articles W transferred to the second support table 3b by the elevating device 1 to a forwarding location outside FIG. 14. It is preferable that the configuration of the automated warehouse 100 can be thus changed appropriately as necessary in the case of applying the elevating device 1 to the automated warehouse 100.

(2) The above embodiment described, as an example, a configuration where the elevating device 1 delivers an article W on the loading conveyor 5 to the first support table 3a and transfers an article W on the first support table 3a to the second support table 3b by causing the mount section 6 to protrude and retreat. However, the elevating device 1 is not limited to this type of configuration. The elevating device 1 may alternatively be operated in a predetermined location in a factory, for example, by an operator placed on the mount section 6.

(3) The above embodiment has described, as an example, a configuration where the second support section 41 is connected to the fixture section 12 of the protruding-retreating mechanism 10. However, the second support section 41 is not limited to this type of configuration, and need not necessarily be connected to the fixture section 12. In the case of the second support section 41 capable of moving in the protruding-retreating direction X, the second support section 41 may be connected to the first movable body 11a of the protruding-retreating mechanism 10, for example, instead of the fixture section 12. In this case, the second support section 41 can move while following the movement of the first movable body 11a, and can, therefore, appropriately support the moment that acts on the protruding-retreating mechanism 10 with each first support section 21 serving as a fulcrum.

(4) The above embodiment has described, as an example, a configuration where the second support section 41 includes the supported members 42, the first rollers 43a, the second rollers 43b, and the roller support 44. However, the second support section 41 is not limited to this type of configuration, and may alternatively be constituted by a linear guide mechanism. Specifically, it is preferable that a guide rail constituting the linear guide mechanism is parallel to the raising-lowering direction Z and is at a fixed position relative to the base 30, and a slider that moves while being guided by the guide rail is connected to the protruding-retreating mechanism 10. In this case, the moment that acts on the protruding-retreating mechanism 10 with each first support section 21 serving as a fulcrum is supported by an area in which the slider comes into contact with the guide rail.

(5) The above embodiment has described, as an example, a configuration where the protruding-retreating mechanism 10 causes the mount section 6 to protrude toward not only the first side X1 in the protruding-retreating direction X but also the second side X2 in the protruding-retreating direction X. However, the protruding-retreating mechanism 10 is not limited to this type of configuration and may alternatively cause the mount section 6 to protrude toward only one side in the protruding-retreating direction X. FIG. 9 shows an example of this type of configuration. The protruding-retreating mechanism 10 in the example in FIG. 9 causes the mount section 6 to protrude toward only the first side X1 in the protruding-retreating direction X. In this case, it is preferable that the second support section 41 includes the first rollers 43a and the second rollers 43b. The first rollers 43a are above the second rollers 43b and on the first side X1 in the protruding-retreating direction X relative to the second rollers 43b. The moment that acts on the protruding-retreating mechanism 10 with each first support section 21 serving as a fulcrum can be appropriately supported by the first rollers 43a and the second rollers 43b while the mount section 6 is protruding toward the first side X1 in the protruding-retreating direction X.

(6) The above embodiment has described, as an example, a configuration where the second support section 41 also has the third rollers 45a disposed in such a manner as to come into contact with the respective first faces 42a below the first rollers 43a, and the fourth rollers 45b disposed in such a manner as to come into contact with the respective second faces 42b above the third rollers 45a. However, the second support section 41 is not limited to this type of configuration. A configuration may alternatively be employed where the second support section 41 includes the first rollers 43a, the second rollers 43b, and the third rollers 45a and does not include the fourth rollers 45b. FIG. 10 shows an example of this type of configuration. In the example in FIG. 10, the first roller 43a and the third roller 45a are on the first side X1 in the protruding-retreating direction X relative to the second roller 43b. The second roller 43b is below the first roller 43a and above the third roller 45a. The first roller 43a and the third roller 45a come into contact with the first face 42a, and the second roller 43b comes into contact with the second face 42b. With this type of configuration as well, the moment that acts on the protruding-retreating mechanism 10 with the first support section 21 serving as a fulcrum is supported by the first roller 43a and the second roller 43b while the mount section 6 is protruding toward the first side X1 in the protruding-retreating direction X. Also, the moment that acts on the protruding-retreating mechanism 10 with the first support section 21 serving as a fulcrum is supported by the second roller 43b and the third roller 45a while the mount section 6 is protruding toward second side X2 in the protruding-retreating direction X. Accordingly, the size of the second support section 41 can be reduced more easily than in the case of using four types of rollers (the first roller 43a, the second roller 43b, the third roller 45a, and the fourth roller 45b).

Figure 11:
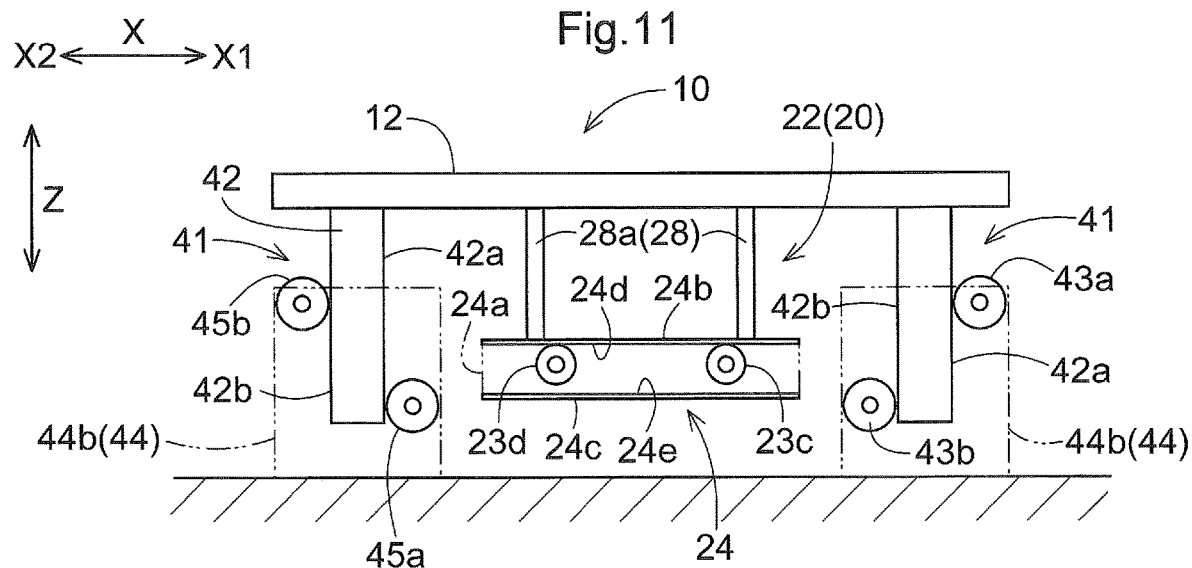
FIG. 11 is a side view schematically showing the second support section and the elevating mechanism according to another embodiment.
Figure 12:
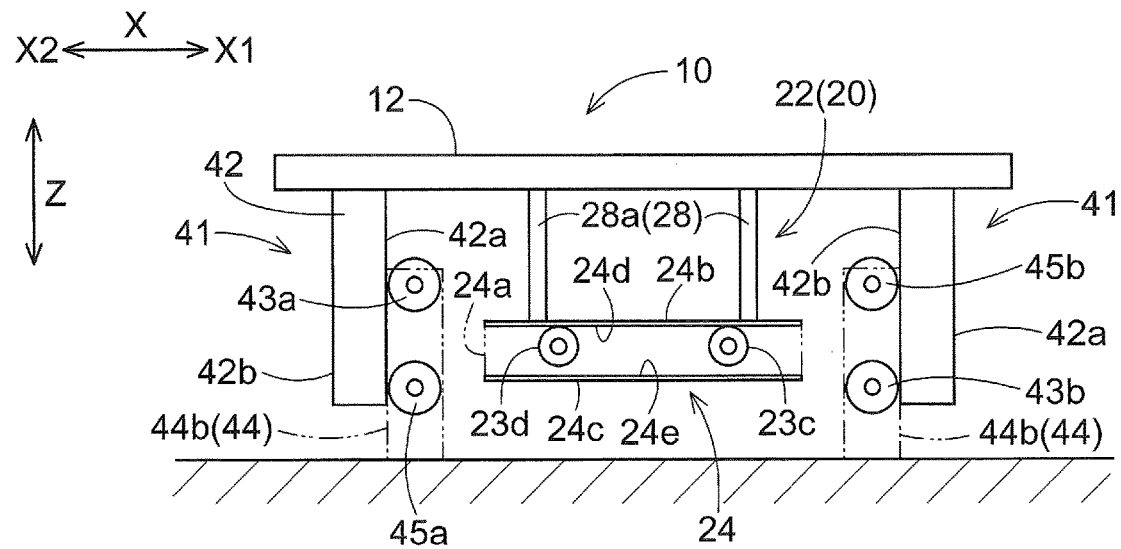
FIG. 12 is a side view schematically showing the second support section and the elevating mechanism according to another embodiment.

Further, two second support sections 41 may be provided, one of which is on one side and the other one on the other side in the protruding-retreating direction X relative to the elevating mechanism 20 and the base 30. FIGS. 11 and 12 show examples of this type of configuration. In the examples in FIGS. 11 and 12, a plurality of (here, two) supported members 42 are fixed to the fixture section 12, on each side in the width direction Y. Specifically, on each side in the width direction Y, the two supported members 42 are provided on respective sides in the protruding-retreating direction X with the elevating mechanism 20 and the base 30 therebetween. Here, in the example in FIG. 11, the first roller 43a and the second roller 43b come into contact with the supported member 42 on the first side X1 in the protruding-retreating direction X, and the third roller 45a and the fourth roller 45b come into contact with the supported member 42 on the second side X2 in the protruding-retreating direction X. The first roller 43a and the second roller 43b that are in contact with the supported member 42 on the first side X1 in the protruding-retreating direction X support the moment that acts on the protruding-retreating mechanism 10 with the first support section 21 serving as a fulcrum while the mount section 6 is protruding toward the first side X1 in the protruding-retreating direction X. Meanwhile, the third roller 45a and the fourth roller 45b that are in contact with the supported member 42 on the second side X2 in the protruding-retreating direction X support the moment that acts on the protruding-retreating mechanism 10 with the first support section 21 serving as a fulcrum while the mount section 6 is protruding toward the second side X2 in the protruding-retreating direction X. In the example in FIG. 12, the second roller 43b and the fourth roller 45b come into contact with the supported member 42 on the first side X1 in the protruding-retreating direction X, and the first roller 43a and the third roller 45a come into contact with the supported member 42 on the second side X2 in the protruding-retreating direction X. The first roller 43a that comes into contact with the supported member 42 on the second side X2 in the protruding-retreating direction X and the second roller 43b that comes into contact with the supported member 42 on the first side X1 in the protruding-retreating direction X support the moment that acts on the protruding-retreating mechanism 10 with the first support section 21 serving as a fulcrum while the mount section 6 is protruding toward the first side X1 in the protruding-retreating direction X. Meanwhile, the third roller 45a that comes into contact with the supported member 42 on the second side X2 in the protruding-retreating direction X and the fourth roller 45b that comes into contact with the supported member 42 on the first side X1 in the protruding-retreating direction X support the moment that acts on the protruding-retreating mechanism 10 with the first support section 21 serving as a fulcrum while the mount section 6 is protruding toward the second side X2 in the protruding-retreating direction X. With this type of configuration as well, each roller comes into contact with the inner face of a corresponding one of the two supported members 42 on the respective sides in the protruding-retreating direction X.

(7) The above embodiment has described, as an example, a configuration where the elevating mechanism 20 includes the first arms 23a that are driven to rotate by the elevation drive source 25, and the first idle rollers 23c. The first support sections 21 are contact areas between the first idle rollers 23c and the respective recessed guides 24 while the mount section 6 is protruding toward the first side X1 in the protruding-retreating direction X. However, the elevating mechanism 20 is not limited to this type of configuration. In the case where the elevating mechanism 20 includes an elevation guide section such as a linear guide mechanism, a section of the elevating mechanism 20 that constitutes this elevation guide section may be the first support section 21.

Furthermore, the elevating mechanism 20 may have a pantograph structure. In this case, it is preferable to provide a hydraulic or pneumatic cylinder as the elevation drive source 25. The first support section 21 is a connecting area between the pantograph and the protruding-retreating mechanism 10 while the mount section 6 is protruding in the protruding-retreating direction X.

(8) The above embodiment has described, as an example, a configuration where the elevating mechanism 20 also includes the second arms 23b and the second idle rollers 23d in addition to the first arms 23a and the first idle rollers 23c. However, the elevating mechanism 20 is not limited to this type of configuration and may alternatively have a configuration without the second arms 23b and the second idle rollers 23d.

(9) Configurations disclosed in each of the above-described embodiments (including the above embodiment and other embodiments; the same applies hereinafter) can also be applied in combination with configurations disclosed in any other embodiment as long as no contradiction arises. As for any configurations, the embodiments disclosed herein are illustrative in all respects and can be modified as appropriate without departing from the gist of the present disclosure.

Summary of Above Embodiment

The following is a summary of the above-described elevating device.

An elevating device according to the present disclosure includes:
- a mount section on which an article is placeable;
- a protruding-retreating mechanism supporting the mount section and configured to cause the mount section to protrude and retreat in a protruding-retreating direction extending in a horizontal direction;
- an elevating mechanism supporting the protruding-retreating mechanism and configured to raise and lower the protruding-retreating mechanism; and
- a base supporting the elevating mechanism,
- wherein the elevating mechanism includes a first support section being an area supporting the protruding-retreating mechanism,
- the elevating device further includes a second support section being separate from the first support section and supporting the protruding-retreating mechanism, and
- the second support section is configured to (i) allow the elevating mechanism to raise and lower the protruding-retreating mechanism, and (ii) support a moment that acts on the protruding-retreating mechanism with the first support section serving as a fulcrum.

According to this configuration, the second support section separate from the first support section is provided as a support section that supports the protruding-retreating mechanism, and can support the moment that acts on the protruding-retreating mechanism with the first support section serving as a fulcrum. This enables the moment that acts on the protruding-retreating mechanism to be supported even if the distance between the mount section and the first support section in the protruding-retreating direction increases due to, for example, the mount section protruding in the protruding-retreating direction. Even if the support rigidity of the first support section is relatively low, it is possible to appropriately support the moment that acts to incline the protruding-retreating mechanism due to a load in the up-down direction that acts on the mount section. Accordingly, it is possible to prevent the entire elevating device from increasing in the size for increased support rigidity of the first support section.

As described above, according to this configuration, it is possible to appropriately support the moment that acts on the protruding-retreating mechanism while preventing an increase in the device size.

Here, it is preferable that the protruding-retreating mechanism includes a movable section configured to operate to cause the mount section to protrude and retreat in the protruding-retreating direction, and a fixture section fixed to the elevating mechanism, and
the second support section is connected to the fixture section.

According to this configuration, the second support section is connected to the fixture section. Therefore, the moment that acts on the protruding-retreating mechanism can be appropriately supported without preventing the protruding-retreating mechanism from the operation to cause the mount section to protrude and retreat.

It is preferable that the protruding-retreating mechanism is configured to cause the mount section to protrude toward a first side in the protruding-retreating direction, the first side being one side in the protruding-retreating direction, and
the second support section includes:
- a supported member fixed to the protruding-retreating mechanism and extending in a raising-lowering direction, which is a direction in which the elevating mechanism raises and lowers the protruding-retreating mechanism;
- a first roller configured to come into contact with a first face of the supported member, the first face facing the first side in the protruding-retreating direction;
- a second roller below the first roller and configured to come into contact with a second face of the supported member, the second face facing a second side in the protruding-retreating direction, the second side being another side in the protruding-retreating direction; and
- a roller support rotatably supporting the first roller and the second roller while fixing positions of rotation axes of the first roller and the second roller relative to the base.

According to this configuration, it is possible to realize, with a relatively simple structure, a configuration where the moment that acts on the protruding-retreating mechanism with the first support section serving as a fulcrum is supported while allowing the elevating mechanism to raise and lower the protruding-retreating mechanism.

It is preferable that the protruding-retreating mechanism is also configured to cause the mount section to protrude toward the second side in the protruding-retreating direction, and
the second support section further includes:
- a third roller below the first roller and configured to come into contact with the first face; and
- a fourth roller above the third roller and configured to come into contact with the second face, and
the roller support further rotatably supports the third roller and the fourth roller while fixing positions of rotation axes of the third roller and the fourth roller relative to the base.

According to this configuration, the second support section can appropriately support the moment that acts on the protruding-retreating mechanism with the first support section serving as a fulcrum even in a configuration where the protruding-retreating mechanism can protrude toward both the first side and the second side in the protruding-retreating direction. In addition, this type of configuration can be realized by a relatively simple structure while preventing the second support section from increasing in the size.

It is preferable that the elevating mechanism further includes:
- an elevation drive source;
- an elevating section configured to move upward and downward together with the protruding-retreating mechanism; and
- a transmission mechanism configured to transmit a driving force of the elevation drive source to the elevating section,
- the transmission mechanism includes:
  - an arm configured to be driven to rotate about a turning axis by the elevation drive source; and
  - an idle roller rotatably supported by the arm, at a position separated from the turning axis in a radial direction,
- the elevating section includes a recessed guide extending orthogonal to the turning axis and extending in the horizontal direction and configured to engage with the idle roller, and
- the first support section is a contact area between the idle roller and the recessed guide.

According to this configuration the first support section includes an engaging section between the idle roller and the recessed guide of the elevating section. This type of configuration of the first support section relatively easily inclines the protruding-retreating mechanism with the first support section serving as a fulcrum due to a load in the up-down direction that acts on the mount section. However, the moment that acts with the first support section serving as a fulcrum in such a manner as to incline the protruding-retreating mechanism can be appropriately supported by providing the second support section separate from the first support section. This can prevent the protruding-retreating mechanism from being significantly inclined with the first support section serving as a fulcrum.

It is preferable that, with a first side in the protruding-retreating direction being one side in the protruding-retreating direction, and a second side in the protruding-retreating direction being another side in the protruding-retreating direction,
- the arm serves as a first arm, the idle roller serves as a first idle roller, and the turning axis serves as a first turning axis,
- the transmission mechanism further includes:
  - a second arm separated from the first arm on the second side in the protruding-retreating direction and configured to be driven to rotate about a second turning axis by the elevation drive source; and
  - a second idle roller rotatably supported by the second arm, at a position separated from the second turning axis in a radial direction, and
- the recessed guide includes:
  - an upper opposing face opposing the first idle roller and the second idle roller from above; and
  - a lower opposing face opposing the first idle roller and the second idle roller from below, and
- the second idle roller is separated from the lower opposing face while the first idle roller is in contact with the upper opposing face from below and supporting the protruding-retreating mechanism.

According to this configuration, the first support section can support only the load in the raising-lowering direction that acts on the protruding-retreating mechanism, and the second support section can support only the moment that acts on the protruding-retreating mechanism with the first support section serving as a fulcrum. Accordingly, the first support section and the second support section can appropriately support the load that acts on the protruding-retreating mechanism while separately serving to support the protruding-retreating mechanism.

The elevating device according to the present disclosure need only exhibit at least one of the above-described effects.

What is claimed is:

1. An elevating device comprising:
   a mount section on which an article is placeable;
   a protruding-retreating mechanism supporting the mount section and configured to cause the mount section to protrude and retreat in a protruding-retreating direction extending in a horizontal direction;
   an elevating mechanism supporting the protruding-retreating mechanism and configured to raise and lower the protruding-retreating mechanism; and
   a base installed on a floor surface and supporting the elevating mechanism,
   wherein the elevating mechanism comprises a first support section that is an area supporting the protruding-retreating mechanism,
   wherein the elevating device further comprises a second support section that is separate from the first support section, installed on the floor surface and supports the protruding-retreating mechanism, and
   wherein the second support section is configured to (i) allow the elevating mechanism to raise and lower the protruding-retreating mechanism, and (ii) support a moment that acts on the protruding-retreating mechanism with the first support section serving as a fulcrum.

2. The elevating device according to claim 1,
   wherein the protruding-retreating mechanism comprises a movable section configured to operate to cause the mount section to protrude and retreat in the protruding-retreating direction, and a fixture section fixed to the elevating mechanism, and
   wherein the second support section is connected to the fixture section.

3. The elevating device according to claim 2,
   wherein the moveable section slides in the protruding-retreating direction with respect to the fixture section, and
   wherein the mount section is fixed to the movable section and integrally moves with the movable section in the protruding-retreating direction.

4. The elevating device according to claim 3,
   wherein the protruding-retreating mechanism is configured to cause the mount section to protrude and retreat toward both sides in the protruding-retreating direction with respect to the fixture section.

5. The elevating device according to claim 1,
   wherein the elevating mechanism further comprises:
     an elevation drive source;
     an elevating section configured to move upward and downward together with the protruding-retreating mechanism; and
     a transmission mechanism configured to transmit a driving force of the elevation drive source to the elevating section,
   wherein the transmission mechanism comprises:
     an arm configured to be driven to rotate about a turning axis by the elevation drive source; and
     an idle roller rotatably supported by the arm, at a position separated from the turning axis in a radial direction, wherein the elevating section comprises a recessed guide extending orthogonal to the turning axis and extending in the horizontal direction and configured to engage with the idle roller, and wherein the first support section is a contact area between the idle roller and the recessed guide.

6. An elevating device comprising:

a mount section on which an article is placeable;

a protruding-retreating mechanism supporting the mount section and configured to cause the mount section to protrude and retreat in a protruding-retreating direction extending in a horizontal direction;

an elevating mechanism supporting the protruding-retreating mechanism and configured to raise and lower the protruding-retreating mechanism; and a base supporting the elevating mechanism, wherein the elevating mechanism comprises a first support section that is an area supporting the protruding-retreating mechanism, wherein the elevating device further comprises a second support section that is separate from the first support section and supports the protruding-retreating mechanism, wherein the second support section is configured to (i) allow the elevating mechanism to raise and lower the protruding-retreating mechanism, and (ii) support a moment that acts on the protruding-retreating mechanism with the first support section serving as a fulcrum, wherein the protruding-retreating mechanism is configured to cause the mount section to protrude toward a first side in the protruding-retreating direction, and the first side is one side in the protruding-retreating direction, and the plurality of rollers of the second support section comprises:
  a supported member fixed to the protruding-retreating mechanism and extending in a raising-lowering direction, which is a direction in which the elevating mechanism raises and lowers the protruding-retreating mechanism;
  a first roller configured to come into contact with a first face of the supported member, the first face facing the first side in the protruding-retreating direction;
  a second roller below the first roller and configured to come into contact with a second face of the supported member, the second face facing a second side in the protruding-retreating direction, and the second side is another side in the protruding-retreating direction; and
  a roller support rotatably supporting the first roller and the second roller while fixing positions of rotation axes of the first roller and the second roller relative to the base.

7. The elevating device according to claim 6, wherein the protruding-retreating mechanism is also configured to cause the mount section to protrude toward the second side in the protruding-retreating direction, and the second support section further comprises:
  a third roller below the first roller and configured to come into contact with the first face; and
  a fourth roller above the third roller and configured to come into contact with the second face, and wherein the roller support further rotatably supports the third roller and the fourth roller while fixing positions of rotation axes of the third roller and the fourth roller relative to the base.

8. An elevating device comprising:

a mount section on which an article is placeable;

a protruding-retreating mechanism supporting the mount section and configured to cause the mount section to protrude and retreat in a protruding-retreating direction extending in a horizontal direction;

an elevating mechanism supporting the protruding-retreating mechanism and configured to raise and lower the protruding-retreating mechanism; and a base supporting the elevating mechanism, wherein the elevating mechanism comprises a first support section that is an area supporting the protruding-retreating mechanism, wherein the elevating device further comprises a second support section that is separate from the first support section and supports the protruding-retreating mechanism, wherein the second support section is configured to (i) allow the elevating mechanism to raise and lower the protruding-retreating mechanism, and (ii) support a moment that acts on the protruding-retreating mechanism with the first support section serving as a fulcrum, wherein the elevating mechanism further comprises:
  an elevation drive source;
  an elevating section configured to move upward and downward together with the protruding-retreating mechanism; and
  a transmission mechanism configured to transmit a driving force of the elevation drive source to the elevating section, wherein the transmission mechanism comprises:
  an arm configured to be driven to rotate about a turning axis by the elevation drive source; and
  an idle roller rotatably supported by the arm, at a position separated from the turning axis in a radial direction, wherein the elevating section comprises a recessed guide extending orthogonal to the turning axis and extending in the horizontal direction and configured to engage with the idle roller, wherein the first support section is a contact area between the idle roller and the recessed guide, wherein, with a first side in the protruding-retreating direction is one side in the protruding-retreating direction, and a second side in the protruding-retreating direction is another side in the protruding-retreating direction, wherein the arm serves as a first arm, the idle roller serves as a first idle roller, and the turning axis serves as a first turning axis, wherein the transmission mechanism further comprises:
  a second arm separated from the first arm on the second side in the protruding-retreating direction and configured to be driven to rotate about a second turning axis by the elevation drive source; and
  a second idle roller rotatably supported by the second arm, at a position separated from the second turning axis in a radial direction, and wherein the recessed guide comprises:
  an upper opposing face opposing the first idle roller and the second idle roller from above; and
  a lower opposing face opposing the first idle roller and the second idle roller from below, and wherein the second idle roller is separated from the lower opposing face while the first idle roller is in contact with the upper opposing face from below and supporting the protruding-retreating mechanism.

\* \* \* \* \*